United States Patent
Glass et al.

(10) Patent No.: US 12,106,121 B1
(45) Date of Patent: *Oct. 1, 2024

(54) TECHNIQUES FOR UTILIZING DIRECTED ACYCLIC GRAPHS FOR DEPLOYMENT INSTRUCTIONS

(71) Applicant: Oracle International Corporation, Redwood Shores, CA (US)

(72) Inventors: Nathaniel Martin Glass, Bellevue, WA (US); Gregory Mark Jablonski, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,716

(22) Filed: Oct. 30, 2023

Related U.S. Application Data

(63) Continuation of application No. 18/086,455, filed on Dec. 21, 2022, now Pat. No. 11,842,221, which is a continuation of application No. 16/953,262, filed on Nov. 19, 2020, now Pat. No. 11,567,806.

(60) Provisional application No. 62/963,335, filed on Jan. 20, 2020, provisional application No. 62/963,413, filed on Jan. 20, 2020, provisional application No. 62/963,456, filed on Jan. 20, 2020, provisional application No. 62/963,477, filed on Jan. 20, 2020, provisional application No. 62/963,478, filed on Jan. 20, 2020, provisional application No. 62/963,480, filed on Jan. 20, 2020, provisional application No.
(Continued)

(51) Int. Cl.
*G06F 9/50* (2006.01)
*G06F 9/445* (2018.01)

(52) U.S. Cl.
CPC .............................. *G06F 9/44505* (2013.01)

(58) Field of Classification Search
None
See application file for complete search history.

(56) References Cited

U.S. PATENT DOCUMENTS

| | | |
|---|---|---|
| 11,567,806 B2 | 1/2023 | Glass et al. |
| 11,755,337 B2 | 9/2023 | Dockter et al. |
| (Continued) | | |

OTHER PUBLICATIONS

AGS Data Diode Technical Requirements Programmatic Requirements, Accessed from internet on Dec. 20, 2019, 3 pages.
(Continued)

*Primary Examiner* — William C Trapanese
(74) *Attorney, Agent, or Firm* — Kilpatrick Townsend & Stockton LLP

(57) ABSTRACT

Techniques are disclosed for utilizing directed acyclic graphs for deployment instructions. A computer-implemented method can include various operations. Instructions may be executed by a computing device to perform parses of configuration data associated with a deployment. The computing device may cause a first directed acyclic graph (DAG) to be generated, the first DAG being utilized for deploying a first resource based on the parses. A second DAG may be generated for deploying execution targets based on the parses, the second DAG specifying dependencies between execution targets of the deployment. The computing device may generate a linked list data structure based on the parses and may deploy the computing system by traversal of the linked list data structure.

20 Claims, 18 Drawing Sheets

Related U.S. Application Data

62/963,452, filed on Jan. 20, 2020, provisional application No. 62/963,486, filed on Jan. 20, 2020, provisional application No. 62/963,489, filed on Jan. 20, 2020, provisional application No. 62/963,481, filed on Jan. 20, 2020, provisional application No. 62/963,491, filed on Jan. 20, 2020.

(56) References Cited

U.S. PATENT DOCUMENTS

| | | |
|---|---|---|
| 2016/0117189 A1 | 4/2016 | Osborne et al. |
| 2018/0165122 A1 | 6/2018 | Dobrev |
| 2018/0227218 A1 | 8/2018 | Thubert et al. |
| 2019/0220321 A1* | 7/2019 | Yang .................. H04L 41/12 |
| 2020/0220848 A1 | 7/2020 | Patwardhan |
| 2020/0363781 A1 | 11/2020 | Mangels et al. |
| 2021/0019193 A1 | 1/2021 | Ffrench et al. |
| 2021/0073625 A1 | 3/2021 | Cai |

OTHER PUBLICATIONS

AGS Technical Design, Accessed from internet on Dec. 20, 2019, 13 pages.
Design Details, Accessed from internet on Dec. 20, 2019, 5 pages.
Disconnected Region Support, Accessed from internet on Dec. 20, 2019, 15 pages.
Shepherd Business Case and Executive Summary, Accessed from internet on Dec. 20, 2019, 33 pages.
Shepherd Capabilities Service, Accessed from internet on Dec. 20, 2019, 5 pages.
Shepherd Regional, Accessed from internet on Dec. 20, 2019, 4 pages.
Shepherd Regional Control Plane, Accessed from internet on Dec. 20, 2019, 4 pages.
Shepherd Regional Executor Service, Accessed from internet on Dec. 20, 2019, 15 pages.
Terraform Yield, Accessed from internet on Dec. 20, 2019, 6 pages.
U.S. Appl. No. 16/953,262, First Action Interview Pilot Program Pre-Interview Communication mailed on Jul. 22, 2022, 4 pages.
U.S. Appl. No. 16/953,262, Notice of Allowance mailed on Nov. 30, 2022, 17 pages.
U.S. Appl. No. 17/103,733, Non-Final Office Action mailed on Sep. 9, 2021, 12 pages.
U.S. Appl. No. 17/150,778, Notice of Allowance mailed on Apr. 13, 2023, 11 pages.
U.S. Appl. No. 18/086,455, Non-Final Office Action mailed on Jun. 22, 2023, 8 pages.
U.S. Appl. No. 18/086,455, Notice of Allowance mailed on Aug. 8, 2023, 5 pages.
International Application No. PCT/US2021/013585, International Preliminary Report on Patentability mailed on Aug. 4, 2022, 9 pages.
International Application No. PCT/US2021/013585, International Search Report and Written Opinion mailed on Apr. 23, 2021, 12 pages.
Sarma et al., Palantir: Early Detection of Development Conflicts Arising from Parallel Code Changes, Institute of Electrical and Electronics Engineers Transactions on Software Engineering, vol. 38, No. 4, Jul.-Aug. 2012, pp. 889-908.

* cited by examiner

```
 1  resource "phase" R_n {
 2    variable1 = "R_n"
 3    variable2 = "R"
 4    variable3 = true
 5    predecessors = []                              ← 618
 6  }
 7
 8  resource "phase" R_s {
 9    variable1 = "R_s"
10    variable2 = "R"
11    variable3 = true
12    predecessors = [phase.R_n.variable1]           ← 620
13  }
14
15  resource "phase" R_e {
16    variable1 = "R_e"
17    variable2 = "R"
18    variable3 = true
19    predecessors = [phase.R_s.variable1]           ← 622
20  }
21
22  resource "phase" R_w {
23    variable1 = "R_w"
24    variable2 = "R"
25    variable3 = true
26    predecessors = [phase.R_e.variable1]           ← 624
27  }
```

FIG. 6

```
 1  resource "execution_target" us-la {          ← 802
 2      variable1 = "us-la"
 3      variable2 = "R"                            810
 4      variable3 = R_s.variable1
 5      predecessors = []          ← 818
 6  }
 7
 8  resource "execution_target" us-sj {          ← 804
 9      variable1 = "us-sj"
10      variable2 = "R"                            812
11      variable3 = R_s.variable1
12      predecessors = [execution_target.us-la.variable1]          ← 820
13  }
14
15  resource "execution_target" us-sf {          ← 806
16      variable1 = "us-sf"
17      variable2 = "R"                            814
18      variable3 = R_s.variable1
19      predecessors = [execution_target.us-sj.variable1]          ← 822
20  }
21
22  resource "execution_target" us-sd {          ← 808
23      variable1 = "us-sd"
24      variable2 = "R"                            816
25      variable3 = R_s.variable1
26      predecessors = [execution_target.us-sf.variable1]          ← 824
27  }
```

```
1   module "apps_example1" {                              ← 1008
2       variable1 = "./modules/app"
3       variable2 = domains[0]
4       variable3 = alias
5       variable4 = region_instances
6       variable5 = worker.number
7       variable6 = namespaces.example
8       variable7 = value.number
9   }
10                                                        ← 1010
11  module "apps_example2" {
12      variable1 = "./modules/app"
13      variable2 = domains[1]
14      variable3 = compartment.id
15      variable4 = region_instances
16      variable5 = worker.number
17      variable6 = namespaces.example
18      variable7 = value.number
19  }
20                                         ← 1012   ← 1014
21  resource "type" "executor" {
22      variable1 = module.apps_example1.variable1
23      variable2 = module.apps_example1.variable3      ← 1016
24      artifact {
25          variable3 = exampleurl.uri
26          variable4 = example.version
27          variable5 = example.type
28      }
29      depends_on = apps_example2.variable2
30  }
```

1002 → (line 1)  1004 → (line 11)  1006 → (line 21)

```
1   resource "type1" "object_storage" {
2       variable1 = capability
3       variable2 = "object_storage"
4       variable3 = region
5   }
6   resource "type2" "worker" {
7       depends_on = capabilities.object_storage
8       ...
9   }
10  
11  resource "type3" "peacock" {
12      variable1 = value
13      variable2 = region
14  }
15  
16  resource "type4" "LB" {
17      count = type3.peacock.exists
18      ...
19  }
20
```

FIG. 11

TECHNIQUES FOR UTILIZING DIRECTED ACYCLIC GRAPHS FOR DEPLOYMENT INSTRUCTIONS

The present application is a continuation of U.S. patent application Ser. No. 18/086,455, filed Dec. 21, 2022, entitled "TECHNIQUES FOR UTILIZING DIRECTED ACYCLIC GRAPHS FOR DEPLOYMENT INSTRUCTIONS", which is a continuation of U.S. patent application Ser. No. 16/953,262, filed Nov. 19, 2020, entitled "TECHNIQUES FOR UTILIZING DIRECTED ACYCLIC GRAPHS FOR DEPLOYMENT INSTRUCTIONS", which is non-provisional application of, and claims the benefit and priority under 35 U.S.C. 119 (e) of the following U.S. Provisional Applications, the entire contents of which are incorporated by reference for all purposes:

U.S. Provisional Application No. 62/963,335, filed Jan. 20, 2020, entitled "TECHNIQUES FOR DEPLOYING INFRASTRUCTURE RESOURCES WITH A DECLARATIVE PROVISIONING TOOL";

U.S. Provisional Application No. 62/963,413, filed Jan. 20, 2020, entitled "TECHNIQUES FOR DETECTING DRIFT IN A DEPLOYMENT ORCHESTRATOR";

U.S. Provisional Application No. 62/963,456, filed Jan. 20, 2020, entitled "USER INTERFACE TECHNIQUES FOR AN INFRASTRUCTURE ORCHESTRATION SERVICE";

U.S. Provisional Application No. 62/963,477, filed Jan. 20, 2020, entitled "TECHNIQUES FOR UTILIZING DIRECTED ACYCLIC GRAPHS FOR DEPLOYMENT INSTRUCTIONS";

U.S. Provisional Application No. 62/963,478, filed Jan. 20, 2020, entitled "TECHNIQUES FOR RESOLVING APPLICATION UPDATES";

U.S. Provisional Application No. 62/963,480, filed Jan. 20, 2020, entitled "TECHNIQUES FOR MANAGING DEPENDENCIES OF AN ORCHESTRATION SERVICE";

U.S. Provisional Application No. 62/963,452, filed Jan. 20, 2020, entitled "TECHNIQUES FOR ROLLBACK OF AN INFRASTRUCTURE ORCHESTRATION SERVICE";

U.S. Provisional Application No. 62/963,486 filed Jan. 20, 2020, entitled "TECHNIQUES FOR DEPLOYING INFRASTRUCTURE COMPONENTS IN PHASES";

U.S. Provisional Application No. 62/963,489, filed Jan. 20, 2020, entitled "TECHNIQUES FOR MANAGING LONG-RUNNING TASKS WITH A DECLARATIVE PROVISIONER";

U.S. Provisional Application No. 62/963,481, filed Jan. 20, 2020, entitled "TECHNIQUES FOR TRANSFERRING DATA ACROSS AIR GAPS"; and U.S. Provisional Application No. 62/963,491, filed Jan. 20, 2020, entitled "TECHNIQUES FOR PREVENTING CONCURRENT EXECUTION OF DECLARATIVE INFRASTRUCTURE PROVISIONERS".

BACKGROUND

Today, cloud infrastructure services utilize many individual services to provision and deploy code and configuration (respectively) across the cloud infrastructure service's many regions. These tools require significant manual effort to use, especially given that provisioning is generally declarative and deploying code is imperative. Additionally, as the number of service teams and regions grows, the cloud infrastructure service will need to continue to grow. Some cloud infrastructure service's strategies of deploying to a larger number of smaller regions includes per-region expenditures, which may not scale well.

BRIEF SUMMARY

Techniques are disclosed for utilizing directed acyclic graphs for deployment instructions. In some embodiment, a computer-implemented method can include various operations. Instructions may be executed by a computing device to perform parses of configuration data associated with a deployment. The computing device may cause a first directed acyclic graph (DAG) to be generated, the first DAG being utilized for deploying a first resource based on the parses. A second DAG may be generated for deploying execution targets based on the parses, the second DAG specifying dependencies between execution targets of the deployment. The computing device may generate a linked list data structure based on the parses and may deploy the computing system by traversal of the linked list data structure.

In other embodiments, a system is disclosed for utilizing DAGs for deployment instructions. The system may comprise one or more processors and one or more memories storing computer-executable instructions that, when executed by the one or more processors, configure the one or more processors to perform various operations. A computing device may execute instructions to perform one or more parses of configuration data associated with a deployment of a computing system. The computing device may cause a first DAG to be generated, the first DAG being utilized for deploying a first resource based at least in part on performing the one or more parses. The computing device may generate a second DAG for deploying a plurality of execution targets based at least in part on performing the one or more parses, the second DAG specifying dependencies between execution targets of the deployment. The computing device may generate a linked list data structure based at least in part on performing the one or more parses, the linked list data structure specifying dependencies between a plurality of deployment phases. And, the computing device may deploy the computing system based at least in part on traversing the linked list data structure, the second DAG, and the first DAG.

In other embodiments, a computer-readable storage medium is disclosed, for utilizing DAGs for deployment instructions, that may store computer-executable instructions that, when executed by one or more processors, cause the one or more processors to perform various operations. A computing device may execute instructions to perform one or more parses of configuration data associated with a deployment of a computing system. The computing device may cause a first DAG to be generated, the first DAG being utilized for deploying a first resource based at least in part on performing the one or more parses. The computing device may generate a second DAG for deploying a plurality of execution targets based at least in part on performing the one or more parses, the second DAG specifying dependencies between execution targets of the deployment. The computing device may generate a linked list data structure based at least in part on performing the one or more parses, the linked list data structure specifying dependencies between a plurality of deployment phases. And, the computing device may deploy the computing system based at least in part on traversing the linked list data structure, the second DAG, and the first DAG.

BRIEF DESCRIPTION OF DRAWINGS

To easily identify the discussion of any particular element or act, the most significant digit or digits in a reference number refer to the figure number in which that element is first introduced.

FIG. 6 is an example code segment for defining a list and order of phases, according to at least one embodiment.

FIG. 8 is an example code segment for defining a list and order of execution targets, according to at least one embodiment.

FIG. 10 is an example code segment for establishing explicit and implicit dependencies between resources of an execution target, according to at least one embodiment.

FIG. 11 is an example code segment for establishing explicit and implicit dependencies between resources of an execution target, according to at least one embodiment.

DETAILED DESCRIPTION

Figure 1:
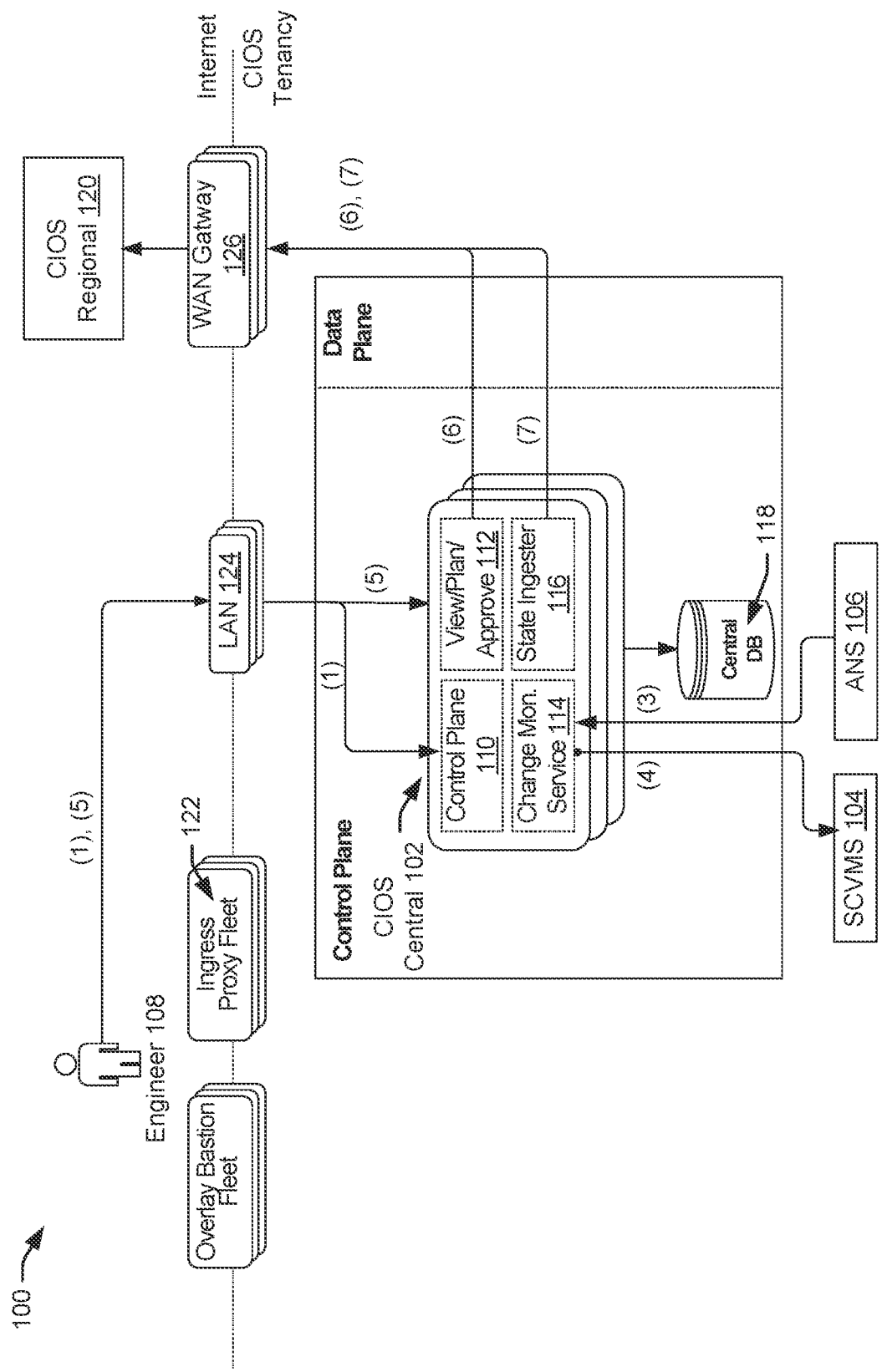
FIG. 1 is a block diagram of an architecture for implementing at least some elements of a cloud infrastructure orchestration service, according to at least one embodiment.

In some examples, infrastructure as a service (IaaS) is one particular type of cloud computing. IaaS can be configured to provide virtualized computing resources over a public network (e.g., the Internet). In some examples, IaaS is one of the three main categories (or sub-categories) of cloud computing services. Most consider the other main categories to be software as a service (SaaS) and platform as a service (PaaS), and sometimes SaaS may be considered a broader category, encompassing both PaaS and IaaS, with even some considering IaaS to be a sub-category of PaaS as well.

In an IaaS model, a cloud computing provider can host the infrastructure components (e.g., servers, storage devices, network nodes (e.g., hardware), deployment software, platform virtualization (e.g., a hypervisor layer), or the like).

In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) in each VM, deploy middleware, such as databases, create storage buckets for workloads and backups, and install even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., selling) IaaS. An entity might also opt to deploy a private cloud, becoming its own provider of infrastructure services.

In some examples, IaaS deployment is the process of putting a new application, or a new version, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some embodiments, IaaS provisioning may include generating a directed acyclic graph (DAG). A DAG may be a finite directed graph that includes any suitable number of nodes and edges, with each edge being directed from one node to another. The nodes and edges may be arranged to avoid directed cycles. That is, the DAG is arranged such that there is no way to start at any node and follow a consistently directed sequence of edges that eventually loop back to that same node. IaaS provisioning may include parsing configuration files corresponding to one or more resources (e.g., services, software resources, etc.) of the system. A separate DAG may be generated for each resource. The DAG for each resource may define dependencies of that resource on capabilities of one or more other resources. A "capability" may be intended to refer to a portion of functionality of a given resource. A process may be instantiated to traverse a DAG. When a node of the DAG is reached that corresponds to a capability that is currently unavailable, the process may publish to a scheduling service an indication that the process has reached a dependency on the capability and thus, is waiting for that particular capability to become available before it can proceed. As various resources of the system are deployed and/or booted up these resources may publish to a scheduling service an indication of the various capabilities availability as the capabilities become available. As used herein, the term "boot," "booting," "booted" refer to a process of performing a startup sequence of operations corresponding to a particular resource (e.g., a software service, a computing device, etc.). Deploying a resource (e.g., a software service) can include booting and/or otherwise making available at least some portion of functionality provided by the resource. When the scheduling service determines that the particular capability has become available, it may restart the process from the point at which it exited last (e.g., just after publishing the need for the capability). The process may regenerate the DAG and recommence traversal (e.g., from the last node accessed). By utilizing the DAGs for each resource, the system may manage capabilities between resources such that human operators are no longer need to manually boot a complex system up.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

As noted above, one way to provision the infrastructure is to describe it declaratively. As such, the configuration file may be a declarative file that merely describes each of the infrastructure components noted above and how they interact. The configuration file can describe the resource and the relevant fields needed to create the element, and then as other elements can be described that reference the previously described elements. In some examples, a provisioning tool can then generate a workflow for creating and managing the elements that are described in the configuration file.

In some instances, the workflow of the provisioning tool may be configured to perform various commands. One function that can be performed is view reconciliation, where the provisioning tool can compare the view of the current infrastructure (e.g., the expected state of the infrastructure) with how the infrastructure is actually running. In some instances, performing the view reconciliation function may include querying various resource providers or infrastructure resources to identify what resources are actually running. Another function that the provisioning tool can perform is plan generation, where the provisioning tool can compare the actually running infrastructure components with what the provisioning tool wants the state to look like (e.g., the desired configuration). In other words, the plan generation function can determine what changes need to be made to bring the resources up to the most current expectations. In some instances, a third function is the execution (e.g., apply) function, where the provisioning tool can execute the plan generated by the plan generation function.

In general, provisioning tools may be configured take the configuration file, parse the declarative information included therein, and programmatically/automatically determine the order in which the resources need to be provisioned in order to execute the plan. For example, if the VPC needs to be booted before the security group rules and VMs are booted, then the provisioning tool will be able to make that determination and implement the booting in that order without user intervention and/or without that information necessarily being included in the configuration file.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

As noted above, generally there are two different tools used to handle each of the provisioning of infrastructure resources and the deployments of code to control the infrastructure resources, with orchestration between the two tools being performed manually. However, at scale, manual implementation always leads to deviations. Thus, an automated tool that can both provision and deploy a virtual infrastructure enables more efficient and reliable techniques for implementing a virtual cloud environment.

In some examples, when two tools are used, issues can arise when a user manually makes changes to the code between the provisioning phase and the deployment phase. As described herein, a technique that uses a single tool for both provisioning and deploying can alleviate that by automating the process, such that there isn't an opportunity for manual code changes. It may be the case, that a slight change to the way in which one user codes something, can create major issues in the deployment phase. In some examples, the first time an operator performs an action in a new region (e.g., a typo in the code), the object that was coded with the typo may be that way forever. If the application is deployed with that typo, and the application is not sensitive to that typo (e.g., it still works), it is possible that some time down the road, an additional code change could become sensitive to that typo, and crash the entire system. Thus, the techniques provided herein can remove the gap between provisioning and deployment that can often lead to problems.

In general, modeling deployments is declarative such that a configuration file can be used to declare the infrastructure resources. For example, create, read, update, delete (CRUD) instructions are generally used to generate deployment files using general Representational State Transfer (REST) concepts (e.g., REST Application Programming Interfaces (APIs)). However, deployment itself doesn't generally follow the same concept. Additionally, while the infrastructure provisioning tools tend to be really powerful and/or expressive, the tools for deployment tend to be much more restrictive regarding the operations they can perform (e.g., they are imperative as opposed to declarative). Thus, there has been a long-felt need for a tool that can handle both functional requirements (e.g., provisioning and deployment of infrastructure elements) within a cloud environment.

In some examples, techniques for implementing a cloud infrastructure orchestration service (CIOS) are described herein. Such techniques, as described briefly above, can be configured to manage both provisioning and deploying of infrastructure assets within a cloud environment. In some instances, the CIOS can include two classes of service: the Central and Regional components (e.g., CIOS Central and CIOS Regional). The following terms will be used throughout:

Infrastructure component—A long-lived piece of infrastructure that supports running code.
  Examples: a deployment application, a load balancer, a domain name system (DNS) entry, an object storage bucket, etc.
Artifact—Code being deployed to a deployment application or a Kubernetes engine cluster, or configuration information (hereinafter, "config") being applied to an infrastructure component. These may be read-only resources.
Deployment task—A short-lived task that is often associated with deploying or testing code. Additionally, the deployments tasks are modeled as resources that live no longer than the release that creates them.
  Examples: "deploy $artifact to $environment," "watch $alarm for 10 minutes," "execute $testSuite," or "wait for $manualApproval"
  For example, CIOS can model a deployment orchestrator deployment as the creation of a resource that transitions to the Available state when it completes.
  Because CIOS maintains the state of its cloud infrastructure service declarative provisioner, CIOS can control the lifecycle of these short-lived resources as it relates to releases.
Resource—a CRUD'able resource.
  CIOS models each of the constructs listed above as a resource. The next section discusses this modeling in detail.
Flock—CIOS's model encapsulating a control area and all its components. Exists primarily to model ownership of and point at the infrastructure components.
Flock config—Describes the set of all infrastructure components, artifacts, and deployment tasks associated with a single service.
  Each Flock has exactly one Flock config. Flock configs are checked in to source control.
  Flock configs are declarative. They expect CIOS to provide realm, region, ad, and artifact versions as input.
  Flocks are granular-a Flock consists of a single service and supporting infrastructure.
State—A point-in-time snapshot of the state of every resource in the flock.
Release—A tuple of a specific version of a flock config and a specific version of every artifact that it references.
  Think of a release as describing a state that may not yet exist.
Release plan—The set of steps that the CIOS would take to transition all regions from their current state to the state described by a release.
  Release plans have a finite number of steps and a well-defined start and end time.
Apply—This is a noun. A single attempt to execute a Release plan. An Execution changes the current State of the Flock.

CIOS can be described as an orchestration layer that applies configuration to downstream systems (e.g., world-wide). It is designed to allow world-wide infrastructure provisioning and code deployment with no manual effort from service teams (e.g., beyond an initial approval in some instances). The high level responsibilities of CIOS include, but are not limited to:

Providing teams with a view in to the current state of resources managed by CIOS, including any in-flight change activity.
Helping teams plan and release new changes.
Coordinating activity across various downstream systems within a region to execute approved release plans with no human intervention.
Coordinating activity across regions/realms to execute approved release plans world-wide.

In some examples, CIOS handles onboarding by enabling teams to provide CIOS with configuration information via checked-in code. Additionally, CIOS can automate more things, so this is a heavier-weight exercise than in previous implementations. In some instances, CIOS handles pre-deployment by offering teams the ability to automatically deploy and test code. In some instances, CIOS can handle the writing of change management (CM) policy by enabling automatically generating plans to roll out new artifacts (e.g., world-wide) when a team builds them. It can do this by inspecting the current state of each region and the current CIOS config (which, can itself be an artifact). Additionally, teams can inspect these plans, and may iterate on them by changing the CIOS config and asking CIOS to re-plan. Once the team is satisfied with a plan, they can create a "release" that references the plan. The plan can then be marked as approved or rejected. While teams can still write CMs, they are just pointers to the CIOS plan. Thus, teams can spend less time reasoning about the plan. Plans are more accurate because they are machine generated. Plans are almost too detailed for human consumption; however, it can be displayed via a sophisticated user interface (UI).

In some examples, CIOS can handle execution of CMs by automatically executing the deployment plan. Once release plan has been created and approved, engineers no longer participate in CMs unless CIOS initiates roll-back. In some cases, this may require teams to automate tasks that are currently manual. In some examples, CIOS can handle rolling back a change management (CM) by automatically generating a plan that returns the flock to its original (e.g., pre-release) state when CIOS detects service health degradation while executing. In some examples, CIOS can handle deploying emergent/tactical changes by receiving a release plan that is scoped to a subset of regions and/or a subset of the resources managed by CIOS, and then executing the plan.

Additionally, CIOS may support primitives necessary to define fully automated world-wide deployments. For example, CIOS can measure service health by monitoring alarms and executing integration tests. CIOS can help teams quickly define roll-back behavior in the event of service degradation, then can execute it automatically. CIOS can automatically generate and display release plans and can track approval. In some instances, the language that teams use to describe desired deployment behavior may be declarative. CIOS can combine the functionality of code deployment and infrastructure config (e.g., provisioning) in one system. CIOS also supports flexible ordering across regions, and across components within a region. Teams can express ordering via checked-in config. Teams may call CIOS's planning and release APIs programmatically.

FIG. 1 depicts an architecture 100 for illustrating techniques for implementing at least CIOS Central 102. In some examples, CIOS Central 102 can be the service that handles operations at the level of a "Flock." CIOS Central 102 has a few responsibilities, including but not limited to:

Serving as an authentication gateway for Flock metadata changes and release operations.
Storing an authoritative mapping of Flock metadata to the deployment artifacts and CIOS repositories for the flock.
Coordinating global Releases across Phases and Targets.
Synchronization to enforce policies like "no more than one ongoing release to a Flock at a time."
Detecting changes to Flock configuration (config) and artifacts, and triggering a release generation on such changes.

In some examples, a source code version-control management service (SCVMS) 104 can be configured to store authoritative Flock configuration and an artifact notification service (ANS) 106 can be subscribed to by CIOS Central 102, so that CIOS Central 102 can be informed of new artifact builds. The CIOS Central 102 can then map incoming changes against the affected flocks, and initiate release planning where desired. Additionally, in some examples, an artifact push service (APS) can be invoked by CIOS Central 102, before a release to a target, to ensure any artifacts required for a successful release are present in the target's region ahead of release.

In some examples, customers (e.g., engineers) 108 can call CIOS Central 102 to CRUD flocks and/or releases, and to view the status of ongoing CIOS activity. Flock management service 110 can include one or more API's to manipulate flocks, view/plan/approve service 112 can include CRUD API's to create and approve plans, and to view a central copy of the state of all CIOS-managed resources, change monitoring service 114 can watch SCVMS 104 for changes to flock config, and can receive notifications about changes to other artifacts from ANS 106, and state ingester service 116 can create copies of regional state in CIOS Central database (DB) 118 so that view/plan/approve 112 can expose them. In some examples, the CIOS Central DB 118 can be a DB of flocks, plans, and state. Flock information can be authoritative; while everything else may be a stale copy of data from CIOS Regional 120. CIOS Central 102 may be configured to provide any suitable portion and/or number of user interfaces (e.g., user interfaces 500-1300) for presenting any suitable data related to a flock, a release, an infrastructure component, an artifact, or the like. In some embodiments, CIOS Central 102 may present via any suitable interface data related to one or more releases. A release may include any suitable combination of tasks related to one or more infrastructure components and/or one or more code changes to one or more applications (e.g., artifacts). Some examples of the user interfaces provided by CIOS Central 102 are described below with respect to FIGS. 5-13.

In some examples, engineer 108 can perform an API call for the flock management service 110 (e.g., through the ingress proxy fleet 122) to create a list of flocks. The protocol for making such an API call can be hypertext transport protocol secure (HTTPS) or the like. Relevant access control lists (ACLs) for this operation can include a local area network (LAN) 124 or other private connection. For example, CIOS may manage/control a network-connectivity alternative to using the public Internet for connecting a customer's on-premises data center or network with CIOS (e.g., a dedicated, leased, and/or private connection). Additionally, authentication and authorization (e.g., of the engineer 108) may be performed by a reservation system portal that allows users to manage machine infrastructure (e.g., reservation service). In some instances, CIOS Central 102 can store flock metadata, plans, and state in the Central DB 118, using Java database connectivity (JDBC) or the like. In some examples, ANS 106 can be configured to notify the change monitoring service 114 when new artifacts have been published. The ANS 106 may use HTTPS, and both authentication and authorization may be handled by a mutual transport layer security service. Additionally, in some instances, the change monitoring service 114 can poll the SCVMS 104 for flock configuration changes. This polling can be performed using secure shell (SSH) or other protocols. Authentication of the change monitoring service 114 may be handled by a CIOS system account and authorization may be handled by SCVMS 104.

In some examples, the engineer 108 can use the view/plan/approve service 112 to do one or more of the following operations. The engineer 108 can plan and/or approve by calling CIOS Central 102 to generate and approve plans. The engineer 108 can view by calling CIOS Central 102 to view the status of ongoing CIOS activity world-wide. Additionally, the engineer 108 can CIOS Central 102 to view a replica of the state of CIOS-managed resources world-wide. These API calls (or the like) can be performed via the HTTPS protocol or similar protocols. Additionally, relevant ACLs can be controlled by LAN 124, and both authentication and authorization can be handled by the reservation service. In some examples, the view/plan/approve service 112 can request planning and push plan approval to all regions of CIOS Regional 120 (e.g., using HTTPS or the like). Relevant ACLs can be controlled using a security list managed by the wide area network (WAN) gateway 126. Authentication can be handled by mutual transport layer security and authorization can be handled by various identity policies. Further, the state ingester service 116 can watch CIOS Regional 120 for job status or state changes, so that CIOS can provide a central view of them upon request (e.g., also using HTTPS or the like). ACLSs for this can also be handled by the WAN gateway 126, and both authentication and authorization can be handled by mutual transport layer security services.

Figure 2:
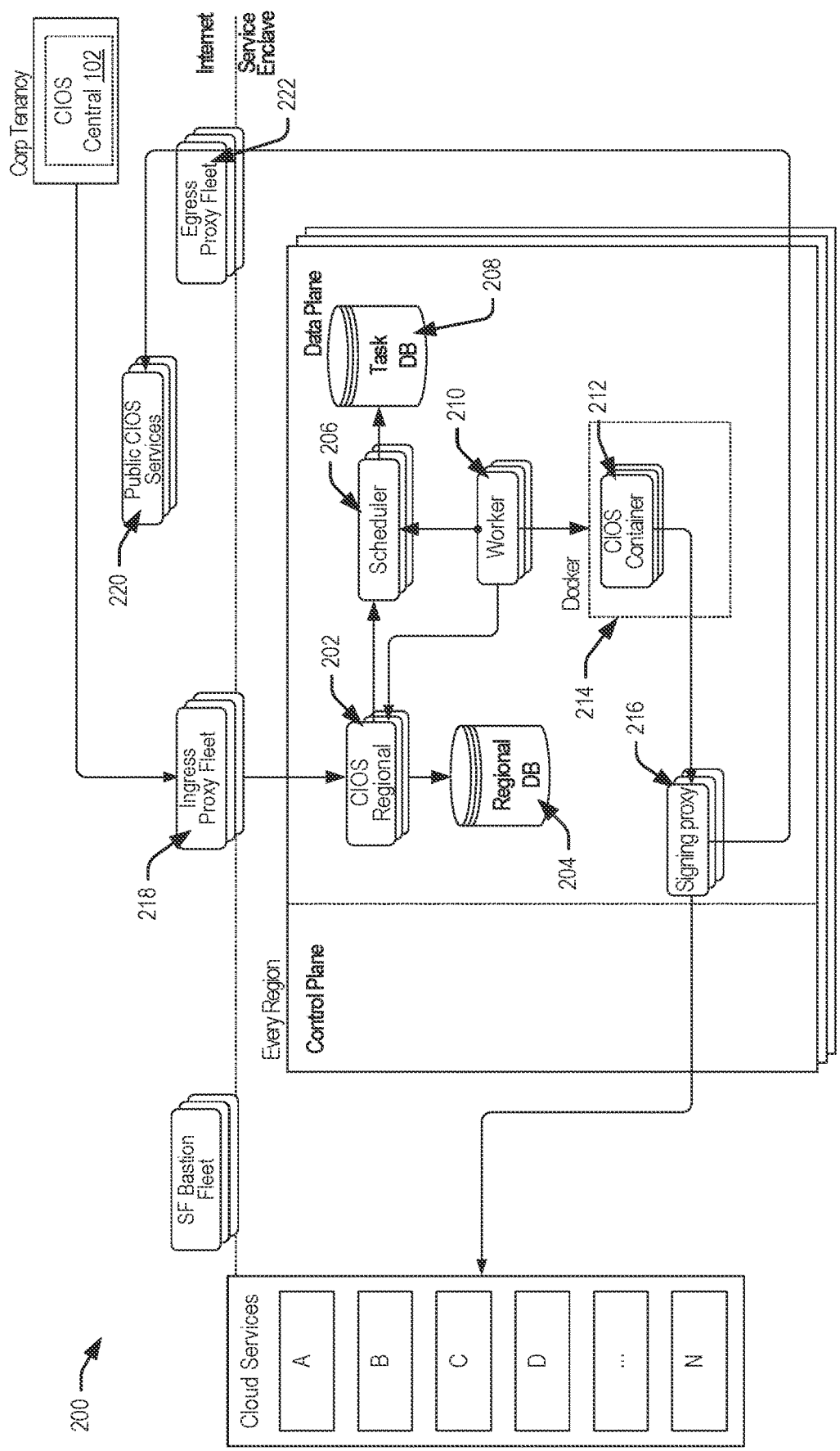
FIG. 2 is a block diagram of an architecture for implementing at least some elements of a cloud infrastructure orchestration service, according to at least one embodiment.

FIG. 2 depicts an architecture 200 for illustrating techniques for implementing at least CIOS Regional 202. In some examples, CIOS Regional 202 is where much of the work of declarative provisioning and planning, as well as approved release application can occur. In some instances, each instance of CIOS Regional 202 may have a regional fronted that can handle operations at the level of "Execution Targets." It can be configured to perform the following:

- Handling all CIOS Authentication for incoming operations from CIOS Central 102.
- Enforcing a rule that only one "execution" (plan/import resources/apply plan) can be ongoing for a given Execution target at a time.
- Managing binary artifact storage for declarative provisioning artifacts used for input and output during declarative infrastructure provisioning execution. Examples of input are declarative infrastructure provisioning configuration files and an input state file. Typical output is a final state file.
- Requesting work from and polls for results from the CIOS Executor for any given execution.

In some instances, the CIOS Frontend may be dependent on a CIOS Executor 206 (also referred to herein as a "scheduler"), which can handle the actual execution. The CIOS Executor, in some examples, operates at the level of "Execution," and it can:

- Track a pool of available Worker nodes
- Query incoming job requests, and assigns them to eligible workers as available
- Track worker status and Execution updates for reporting to clients
- Detect dead nodes via a leasing protocol, and can fail tasks assigned to dead nodes, depending on task status.
- Provide facilities to cancel/kill/pause/resume Executions, and can map those onto facilities to pass cancellation/kill/resumption info on to Worker nodes.

In some instances, the CIOS Executor can depend on CIOS Workers, which can assign tasks for execution to Workers, and provide a facility for Workers to update job progress. The worker service operates at the granularity of "Task." Each worker is an agent executing Tasks assigned to that worker and reporting Task status and output. Each worker can:

- Poll Executor Worker APIs for assigned work items, and take action to make the assign state match its local state:
  - start containers for polls task items that do not exist locally
  - kill containers for locally running containers that have no corresponding assigned task item
- Report status for jobs
- Stage input and output for job container execution
- Launch and monitor declarative infrastructure provisioning containers for doing the real work of a Release for an Execution Target.

CIOS Workers may depend on CIOS Executor to poll work from and report results to the worker endpoint of the CIOS Executor. The Worker may rely on the Executor for all coordination. Additionally, the CIOS Workers may also depend on CIOS Regional 202, where the Worker services reads input from and writes output to one or more APIs that are associated with the Regional Frontend service. Examples of input are configuration and starting state files and import mappings. Examples of output are declarative provisioning process, output declarative provisioning state files, and import result states.

In some examples, CIOS Regional 202 can be a regional service for managing regional instances/deployments of CIOS. CIOS Regional 202 covers responsibility for authoritatively storing and managing plans and stat that pertains to a particular region. A Regional DB 204 may be a CIOS DB for the state and plans in the particular region. This is the authoritative copy of the region's subset of the Central DB 118 of FIG. 1. Scheduler 206 can be responsible for managing worker fleet capacity, assigning tasks to workers, and keeping track of task state. In some instances, Task DB 208 is another CIOS DB for task state. Data in this DB is mostly for operational purposes. Additionally, Worker 210 can be a fleet of java virtual machines (JVMs) that manage declarative provisioning images. These receive instructions from the Scheduler 206 and communicate results to both the Scheduler 206 and CIOS Regional 202. A CIOS container 212 can run declarative provisioning actions in its own private docker 214 container. This container does not need to contain secrets. Additionally, in some examples, a signing proxy 216 can be configured to prevent secret exfiltration via a declarative provisioning tool, in order to avoid putting secrets in the declarative provisioning Image. Instead, CIOS can perform request signing or initiate a mutual transport layer security (mTLS) service in a proxy. This also makes it easier to use FIPS-compliant crypto libraries.

In some examples, CIOS Central 102 can call CIOS Regional 202 to create plans, push approvals, watch job status (service principal), and extract declarative provisioner state (service principal). An ingress proxy 218 can be configured as the ACL and various identity policies may be used for both authentication and authorization. Alternatively, in some examples, the ingress proxy 218 may be replaced with a load balancer configured to balance the load incoming requests, plans, etc. In some instances, CIOS Regional 202 may run a declarative provisioner by asking the scheduler 206 to do so. Worker 210 can ask Scheduler 206 what it should be running, and can report status to Scheduler 206 when done. In some cases, mTLS may handle both authentication and authorization for CIOS Regional 202 and Worker 210. Additionally, when Worker 210 needs to run a declarative provisioner, it does so in docker containers by interacting with the local docker 214. Authentication for this stage may be handled by a local unix socket. A docker protocol may be used for this last step; however, HTTPS may be utilized for the previous ones.

In some embodiments, CIOS Regional 202 may be configured to provide any suitable portion and/or number of user interfaces (e.g., user interfaces 500-1300) for presenting any suitable data related to a flock, a release, an infrastructure component, an artifact, or the like. In some embodiments, CIOS Regional 202 may present via any suitable interface data related to one or more releases. A release may include any suitable combination of tasks related to one or more infrastructure components and/or one or more code changes to one or more applications (e.g., artifacts). Some examples of the user interfaces provided by CIOS Regional 202 are described below with respect to FIGS. 5-13.

In some examples, the CIOS container 212 enables a declarative provisioner to interact (via API) with the signing proxy 216, while the declarative provisioner thinks it's calling various CIOS services. The signing proxy 216 listens on one ephemeral port per calling instance of declarative provisioner, known only to that declarative provisioner. The signing proxy 216 can initiate requests signatures or mTLS, and can pass the declarative provisioner's calls through to other CIOS services within the service enclave. In some instances, the signing proxy 216 can also communicate with one or more public CIOS services 220. For example, the Signing Proxy 216 will use the internal endpoint of public services where possible. For services with no internal endpoint, it must use the egress proxy 222 to reach the external endpoint. This use of the signing proxy 216 may not be for cross-region communication; for example, an egress proxy whitelist in each region may only be for that region's public IP ranges. In some examples, Worker 210 may then persist state and logs from a declarative provisioner in CIOS Regional 202 so that they can be exfiltrated to CIOS Central 102.

Using CIOS, there are a few phases of a representative customer experience: onboarding, pre-release, world-wide release, and tactical release. For the pre-release phase, the below is an example of what happens between a new artifact being built and releasing artifacts to release one (e.g., R1). This should replace some or most of current change management processes. As relevant artifacts are built, CIOS can automatically generate releases using "the latest version of everything in the flock." A release is a specific version of the flock config with specific inputs (e.g. artifact versions, realm, region, and ad). A release contains one roll-forward plan per region and metadata describing region ordering. Each regional plan is the set of operations a declarative provisioner would take to realize the flock configuration in that region. Teams with pre-release environments can use CIOS to automatically release and test software in said environments. Teams can configure CIOS to automatically test the roll-back plan. Teams will be able to inspect and approve releases through the CIOS UI. Teams can approve some but not all of the regional plans within a release. If "the latest version of everything" yielded no suitable plans, teams can ask CIOS to generate a plan for cherry-picked artifact versions.

For the world-wide release phase, the below is an example of how a team executes tomorrow's version of today's "normal CM." Once a release is approved, CIOS pushes each approved regional plan to the respective region. CIOS acts independently within each region to apply approved plans. CIOS will only perform the set of actions explicitly described in that region's plan. Instead of "thinking independently," it will fail. CIOS UI shows teams the progress of the execution. CIOS UI prompts teams when manual approvals are required. If execution fails because of an outage in CIOS or in a downstream service, CIOS can notify the team and can prompt them for next steps (e.g., abort, retry). CIOS does perform retries, but some downstream system outages will exceed its willingness to retry. If execution fails because of service health degradation or a test failure, CIOS will assist teams with rolling the flock back to its starting state. CIOS will notify (e.g., page) teams when it initiates automatic rollback. Teams must approve the roll-back plan, then CIOS will execute it.

For the tactical release phase, the below is an example of how a team can execute tomorrow's version of an "emergent CM." When generating a plan, teams may ask CIOS to target the plan at specific resources in several ways: topologically (e.g., realm, region, AD, etc.), by resource type (e.g., "only metrics configs" or "only deployment orchestration service deployments", etc.), or combinations of the above (e.g., in a disjunctive manner). Teams approve tactical releases just like world-wide releases. CIOS orchestrates them similarly. If a team needs to deploy a tactical release while there is an active a world-wide release, CIOS will stop executing the world-wide release in the targeted regions, then start executing the tactical release.

In some examples, a declarative provisioner's state (e.g., traditionally a file) is an authoritative record of the set of resources managed by the declarative provisioner. It contains the mapping between the logical identifier of each resource from the configuration file and the actual identifier of the resource. When the declarative provisioner is creating a resource, certain kinds of failure can prevent the actual identifier from being recorded in the state. When this happens, the actual identifier is lost to the declarative provisioner. These can be called "orphaned resources."

For most resources, orphans represent waste—the declarative provisioner launched (for example) an instance that it forgot about, but will launch another instance instead the next time it is run. For resources with uniqueness constraints or client-supplied identifiers, orphans prevent the declarative provisioner from making forward progress. For example, if the declarative provisioner creates a user 'nglass' and a failure orphans it, the next run of the declarative provisioner will attempt to create 'nglass' and fail because a user with that username already exists. In some cases, orphans are only a problem when adding new resources to the state. In some instances, the declarative provisioner's refresh behavior may naturally recover from failures to record updates and deletions.

CIOS needs to be robust in the event of downstream service outages or outages of CIOS itself. Because CIOS can leverage a declarative provisioner to apply changes, this means there should be robustness around running the declarative provisioner and maintaining the declarative provisioner state. The declarative provisioner providers perform 'small scale' retries-enough to avoid outages lasting for small numbers of minutes. For example, a cloud provider will retry for up to 30 minutes. Downstream system outages lasting longer than 30 minutes will cause the declarative provisioner to fail. When the declarative provisioner fails, it records all changes it successfully made in the state, then exits. To retry, CIOS must re-execute the declarative provisioner. Re-executing the declarative provisioner also allows CIOS to retry in the event of a failure in CIOS itself. In some instances, CIOS can run the following operations in a loop:

Refresh—the declarative provisioner calls GET APIs to retrieve a fresh snapshot of every resource described in its state.

Plan—the declarative provisioner generates a plan (a concrete set of API calls) that will realize the desired state, given the recently-refreshed current state.

Apply—the declarative provisioner executes the set of steps in the plan.

CIOS may always run all three of these steps when executing the declarative provisioner. The refresh operation helps recover from any updates or deletions that weren't recorded. CIOS inspects the result of the plan operation and compares it to the approved release plan. If the newly generated plan contains operations that were not in the approved release plan, CIOS may fail and may notify the service team.

Figure 3:
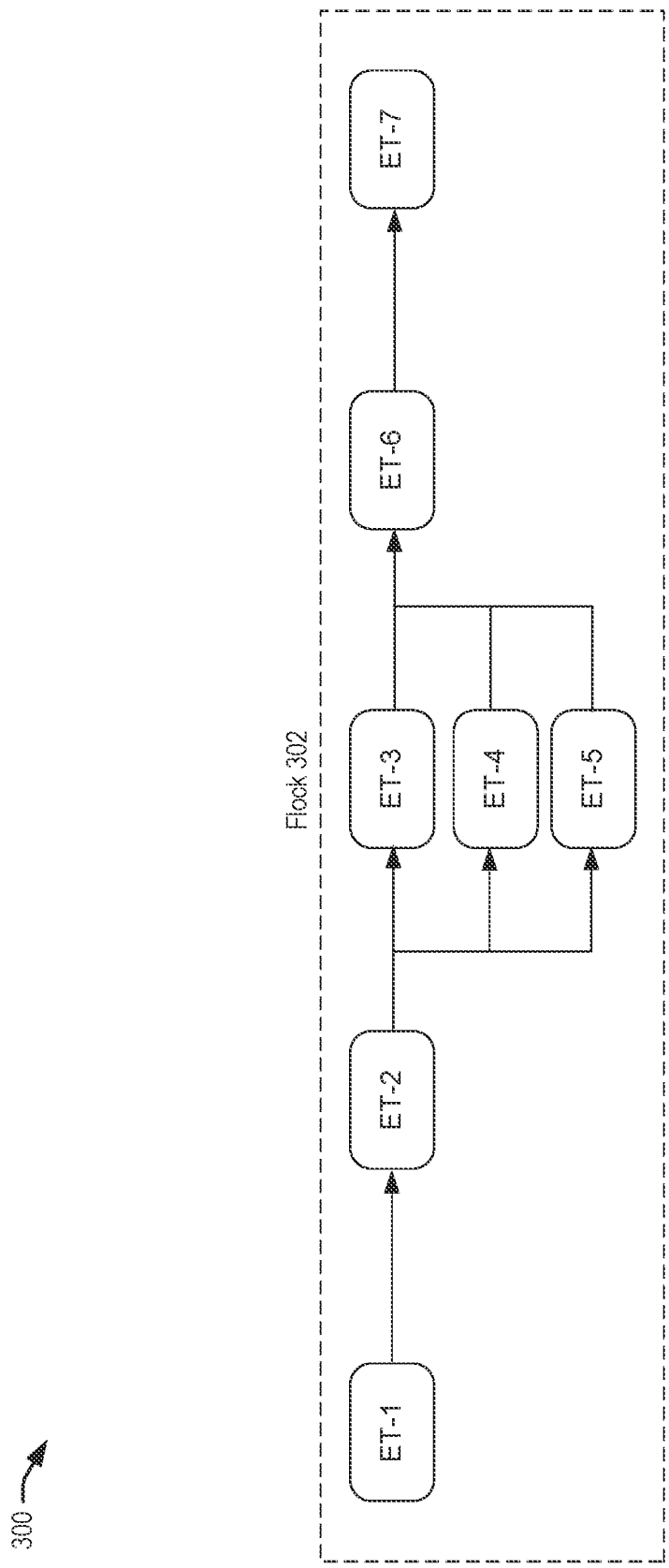
FIG. 3 is a flow diagram for illustrating an example flock, according to at least one embodiment.

FIG. 3 depicts a directed acyclic graph (DAG) 300 for illustrating an example flock 302. The progression of code/config from check-in to production, for a single flock config in CIOS, can be described all the way from the first testing deployment to the last prod deployment. Internally, CIOS calls each element in the progression an Execution Target (ET)—this is all over our internal APIs, but does not leak out in to the flock config. CIOS executes ETs based on the DAG 200 defined in the flock config. Each ET (e.g., ET-1, ET-2, ET-3, ET-4, ET-5, ET-6, and ET-7) is, roughly, one copy of the service described by the flock config.

Figure 4:
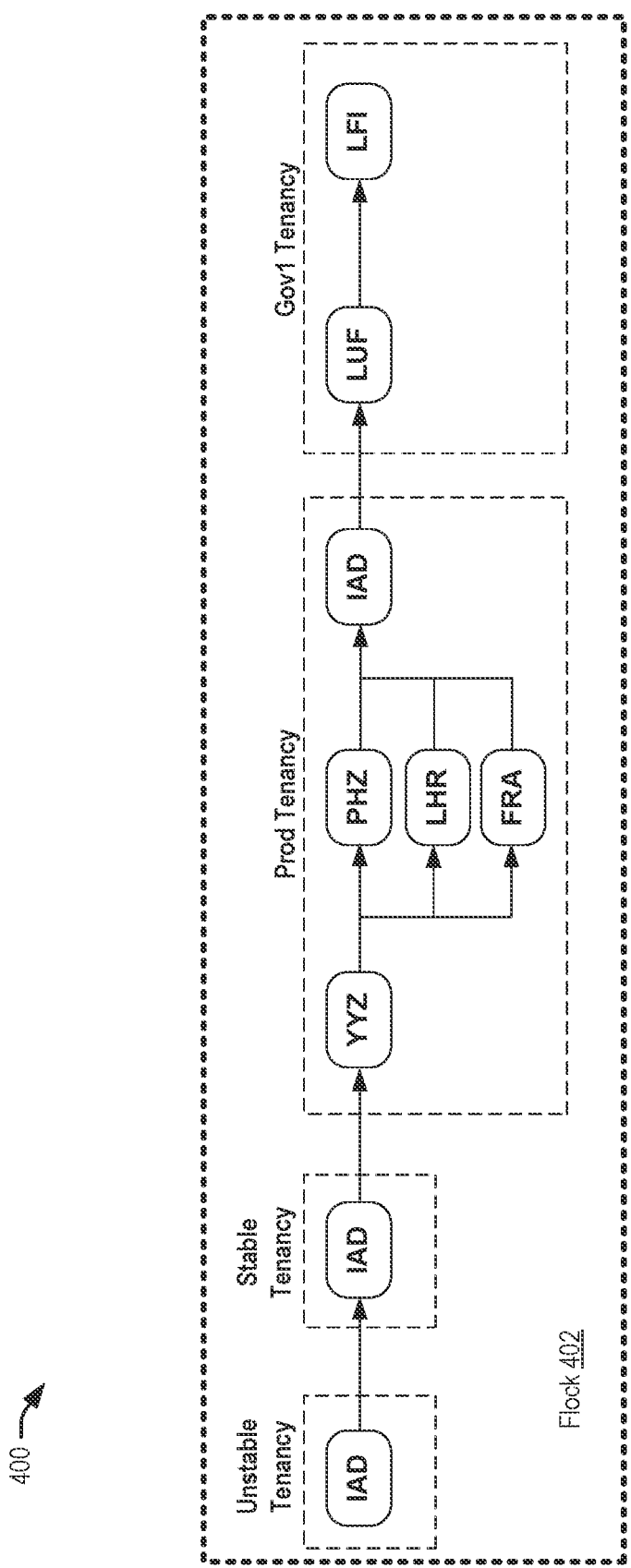
FIG. 4 is a flow diagram for illustrating an example flock, according to at least one embodiment.

FIG. 4 depicts a DAG 400 for illustrating and example flock 402. In the flock config, CIOS is very opinionated about how teams express this progression-they must model it using cloud infrastructure tenancies and regions. Teams should not model progression using realms. CIOS allows teams to use many tenancies within a realm and many regions within a tenancy. However, CIOS does not allow teams to use the same region twice within a tenancy (though they may use the same region twice within a realm-in different tenancies). DAG 400 illustrates a version of DAG 300 from FIG. 3, expressed with tenancies and regions. This example is for an overlay service, where pre-prod ETs are in a prod region. A service enclave service would have the unstable and stable tenancies in release one. In DAG 400, IAD is a regional airport code for Dulles airport in Washington, D.C., YYZ is a regional airport code for Toronto, Ontario, PHX, LHR, and FRA, are regional airport codes for Phoenix, London, and Frankfurt, respectively, and LUF and LFI are for two different air force bases.

In one embodiment, CIOS and/or other techniques described herein are an improvement on each of Terraform (a declarative provisioning tool), Tanden (a code generation tool), and the Oracle Deployment Orchestrator (ODO). Additionally, in some examples, CIOS and/or other techniques described herein can be implemented using at least portions of the Terraform, Tanden, and ODO tools.

Figure 5:
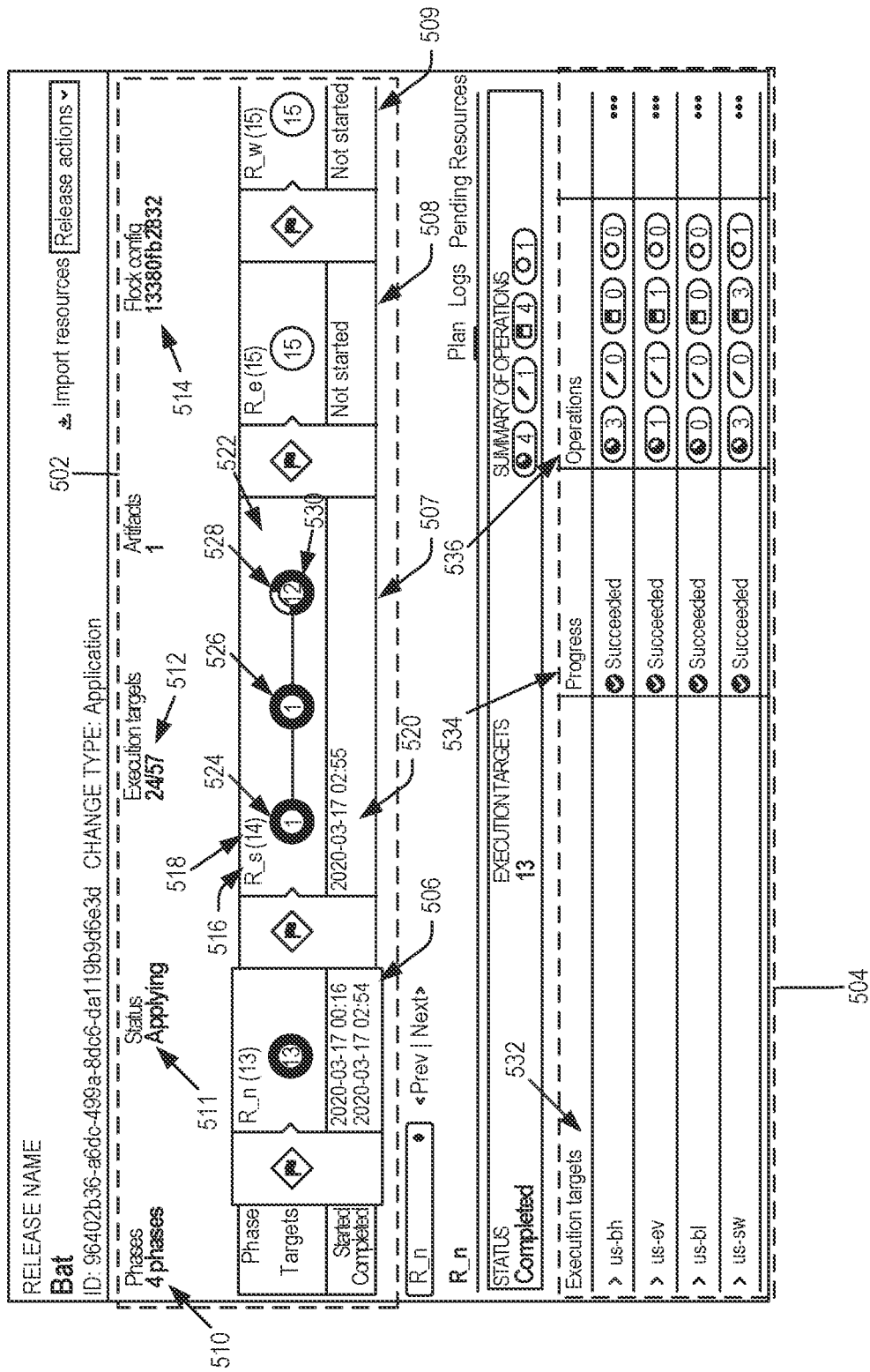
FIG. 5 is a user interface that presents information related to a release including multiple phases and multiple execution targets, according to at least one embodiment.

FIG. 5 is a user interface (UI) 500 that presents information related to a release including multiple phases and multiple execution targets, according to at least one embodiment. The UI 500 may include a phase area 502 and an execution target area 504. The phase area 502 may indicate an ordered list of phases, such as phase 506 (e.g., "R_n"), phase 507 (e.g., "R_s"), phase 508, (e.g., "R_e"), and phase 509 (e.g., "R_w"). In some embodiments, the phase order may be depicted from left to right where the leftmost phase is to be completed before the phase to its right is completed, which in turn, is to be completed before the phase to its right, etc. In some embodiments, the ordered list of phases may be stored in any suitable data structure such as a linked list. An example linked list is discussed in more detail below in connection with FIG. 7.

Each phase may be associated with a number of tasks (e.g., tasks including deploying one or more infrastructure resources to one or more execution targets). The list of phases as illustrated in the UI 500 includes four phases, but any suitable number of phases may be included in the phase area 502 for deploying infrastructure resources at one or more execution targets. In some embodiments, the ordered list of phases presented within phase area 502 may be horizontally scrollable. The phase area 502 may indicate a total number of phases 510, a status 511, a number of completed and/or total number of execution targets 513, and a flock configuration identifier 514. The total number of phases 510 may indicate a total number of phases included in the linked list and the status 511 may indicate a status of the release (e.g., a release that includes. As illustrated in FIG. 5, the status 511 is "applying," but the status 511 may be any suitable status indicator (e.g. "Not Started," "Completed," "Failed," etc.). As depicted in FIG. 5, the number of completed and/or total number of execution targets 513 indicates 24 deployments to execution targets have been completed out of 57 total execution targets. The number of completed and/or total number of execution targets 512 may be presented on the UI 500 in any suitable manner. The flock configuration identifier 514 is presented on the UI 500 as "13380fb2832," but the flock configuration 514 may be presented on the UI 500 in any suitable manner for conveying a unique identifier for the flock configuration file corresponding to the release depicted in FIG. 5.

Each subarea corresponding to a phase may include a phase identifier (e.g., phase identifier 516), a total execution target indicator (e.g., total execution target indicator 518), timestamp information (e.g., timestamp information 520, an execution target tracker area (e.g., execution target tracker area 522), and any other suitable information relating to the phase. For example, identifier 516 (e.g., "R_s") may be any suitable alphanumeric string for uniquely identifying a phase. In some embodiments, an total execution target indicator 518 may be presented adjacent to the identifier 516. The total execution target indicator 518 indicates a number of total execution targets (e.g., 14) that are associated with the given phase.

The timestamp information 520 may include a start time and/or an end time associated with a time when the phase was started and/or completed, respectively. In some embodiments, the timestamp information 520 may include any suitable indicator (e.g., "not started," failed," "completed," etc.) for indicating a status of the corresponding phase. In some embodiments, any suitable information related to the phase may be depicted in phase area 502. The information related to each phase may be similarly presented or the presentation of the phase information may be formatted differently and/or may include more or less information than that depicted in FIG. 5.

An execution target tracker area (e.g., execution target tracker area 522 of the phase 506) may be presented within each phase. The execution target tracker area of each phase may include one or more execution target indicators (e.g., execution target indicators 524, 526, and 528). Each execution target indicator may include a number indicating a number of tasks (e.g., deployments to corresponding execution targets) are to be concurrently executed. By way of example, execution target indicator 524 indicates a deployment to a particular execution target may be executed. The execution target indicator 526 and its placement to the right of the execution target indicator 524 indicates that another deployment to a different execution target is to be executed after the completion of the first task corresponding to execution target indicator 524. The execution target indicator 528 and its placement to the right of the execution target indicator 526 indicates that 12 separate deployments to 12 different execution targets are to be executed after the completion of the second task corresponding to execution target indicator 524. The combination of execution target indicator 524, 526, and 528, collectively depict a collapsed form of a directed acyclic graph (e.g., DAG 900 discussed below in connection with FIG. 9).

In some embodiments, the execution target indicators 524-528 may correspond to a data structure configured to maintain the list of execution targets associated with a phase an order by which tasks (e.g., deployments to each execution target) are to be executed. An example data structure for maintaining this list and order is described in more detail in connection with FIG. 9. Each execution target indicator may include a ring (e.g., ring 530). The ring may be divided into any suitable number of portions corresponding to the number of execution targets associated with the execution target indicator. In the example depicted, the ring 530 may be divided into 12 equal portions. Each portion of the ring 530 may correspond to a particular execution target and may be colorized with a color corresponding to a status of the task corresponding to that particular execution target. By way of example, ring 530 may indicate (e.g., via nine green portions) that nine deployments to execution targets have been completed. The remaining three portions of ring 530 (e.g., colored white) may indicate three tasks corresponding to three execution targets have not yet been started. As another example, the remaining three portions of ring 530 may be colored a different color (e.g., yellow) indicating that corresponding tasks have been started but have yet to be completed. Thus, by looking at the ring 530, the user is able to quickly and visually identify a current status with the tasks associated with execution target indicator 528. By viewing the execution target indicators within execution target tracker area 522, the user can ascertain that deployment to 11 execution targets is complete and three are in progress. In some embodiments, each execution target indicator may correspond to a node of a directed acyclic graph (DAG) (e.g., the DAG 900 of FIG. 9) that is associated with the given phase (e.g., "R_s").

The execution target area 504 may include an execution target column 532, a progress column 534, and an operations column 536. The execution target column 532 may include a list of targets (e.g., execution targets) corresponding to tasks (e.g., deployments) executed in connection with a given phase (e.g., as depicted, phase 506). In some embodiments, the execution target column 532 may be sorted by chronology or any other suitable method for sorting task execution. The progress column 534 may include a list of progress indicators indicating status (e.g., "succeeded," "not started," "in progress," etc.) corresponding to each execution target. The operations column 536 may include a list of operations to be executed with respect to the given execution targets indicated in the execution target column 532. For example, the list of operations included in the operations column 536 may include create, read, update, and delete (CRUD) operations or the like.

FIG. 6 is an example code segment 600 for defining a list and order of phases, according to at least one embodiment. As illustrated in FIG. 6, four phases are defined in code segment 600. Each phase is defined as a resource of type "phase" and assigned an identifier (e.g., "R_n," "R_s," "R_e," and "R_n"). As illustrated in the code segment 600, the resources 602, 604, 606, and 608 correspond with the respective phases. Each phase may include one or more variables one of which may include an indicator for indicating an execution order for each phase. In some embodiments, the indicator may indicate a dependency and/or lack of dependency on one or more other phases. By way of example, the indicator 618 (e.g., predecessors=[ ] at line 5) may indicate a lack of dependency on any other phase. This can be interpreted by the system as defining a first phase to be executed. The indicator 620 (e.g., predeceesors= [phase.R_n.variable 1]) may be utilized to indicate a dependency on another phase (e.g., phase "R_n") through inclusion of an assignment of a value corresponding to a variable associated with another phase (e.g., phase "R_n"). Similarly, indicator 622 may indicate a dependency on another phase (e.g., phase "R_s" through inclusion of an assignment of a value corresponding to a variable associated with "R_s") and indicator 624 may indicate a dependency on yet another phase (e.g., phase "R_e" through inclusion of an assignment of a value corresponding to a variable associated with "R_e").

Figure 7:
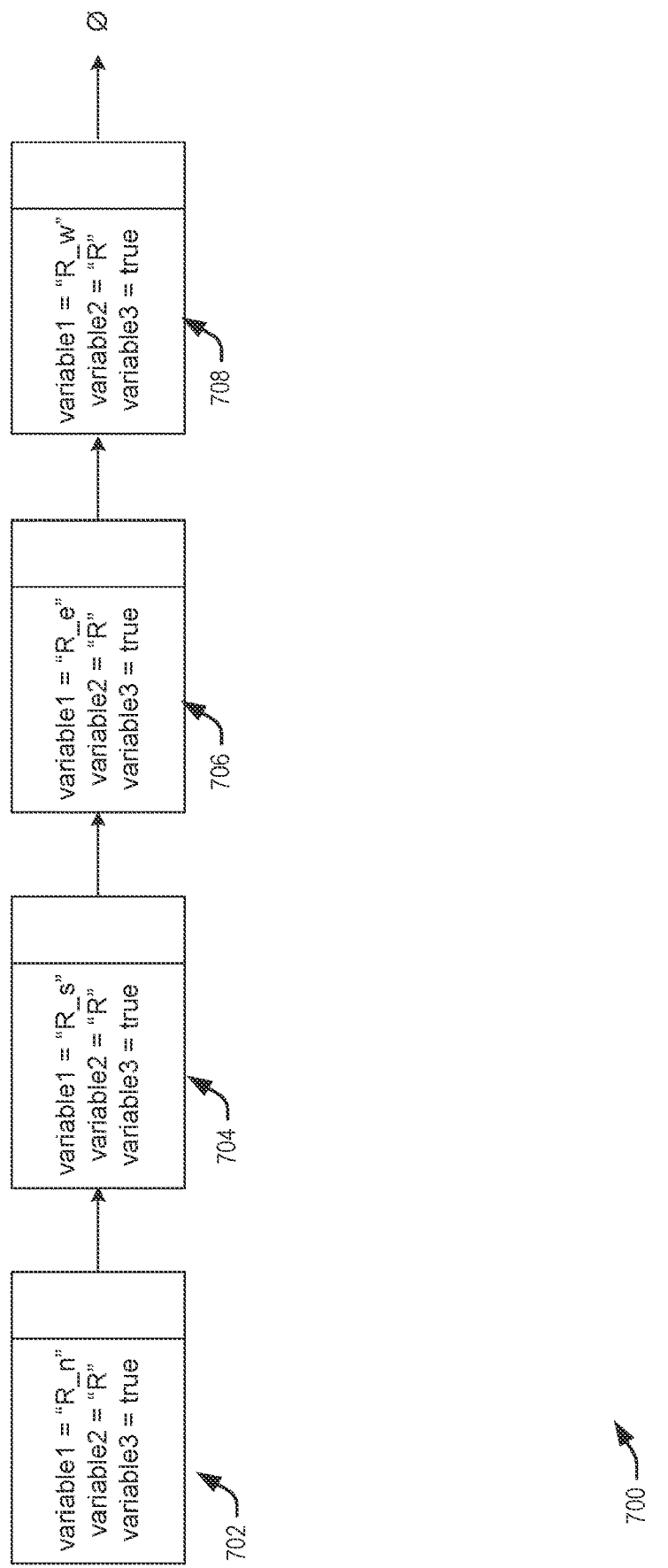
FIG. 7 is an example data structure that may be generated by a cloud infrastructure orchestration service (CIOS) to maintain a list and order associated with one or more phases, according to at least one embodiment.

In some embodiments, code segment 600 may be included in a configuration file corresponding to a release. The configuration file may be parsed/traversed one or more times as part of executing a preprocessing procedure. In one of these traversals, the code segment 600 may be analyzed to generate a data structure with which the identity and order of execution corresponding to one or more phases may be maintained. FIG. 7 depicts one example data structure (e.g., a linked list) which may be utilized to maintain this information.

The indicators 618-624 may be utilized to establish the specific order by which phases are to be executed. For example, as depicted in FIG. 6, phase "R_n" is to be executed first, followed by phase "R_s", followed by phase "R_e", followed by phase "R_w". It should be appreciated that a dependency may indicate one or more other phases which are to be completed before tasks associated with a given phase commence. Although four phases are defined in FIG. 6, it should be appreciated that any suitable number of phases may be defined in a similar manner.

FIG. 7 is an example data structure (e.g., linked list 700) generated by a cloud infrastructure orchestration service (CIOS) to maintain a list and order associated with one or more phases. Linked list 700 may be generated to identify the phases and execution order as defined in the code segment 600 of FIG. 6. As illustrated in FIG. 7, the linked list 700 includes four nodes 702, 704, 706, and 708 that may each correspond to a phase of the four phases defined in code segment 600. Each node of the linked list may correspond to a data object that is configured to store any suitable information corresponding to a given phase. By way of example, a given node may store any suitable number of variables, identifiers, data structures, pointers, references, etc. corresponding to a particular phase. As a non-limiting example, the node 702, corresponding to phase "R_n" may store the three variables defined in code segment 600 as corresponding to the phase "R_n." Each node of linked list 700 may include any suitable number of variables corresponding to a given phase.

Each node of the linked list may include a pointer/ reference to another node in the linked list (in scenarios in which there are multiple phases). By way of example, node 702 may include a reference to node 704, which may include a reference to node 706, which may include a reference to node 708, which may indicate (e.g., via a null pointer) that it is the end node of the linked list 700. In some embodiments, these pointers/references may be identified based on the indicators 618-624 of code segment 600.

In some embodiments, at execution time, the CIOS may identify an order by which particular phases are to be executed based at least in part on traversing the linked list 700 starting at node 702 (e.g., a starting node). Execution of these phases may utilize any suitable combination of the data stored within each corresponding node. Upon completing operations corresponding to a given phase, CIOS may traverse to the next phase, repeating this process any suitable number of times until operations corresponding to an end node of the linked list 700 (e.g., node 708) have been completed. In some embodiments, if the operations of a given node are unsuccessful (e.g., produce an error), CIOS may not traverse to the next node and may instead stop deployment and return a notification to alert the user of the situation.

Figure 9:
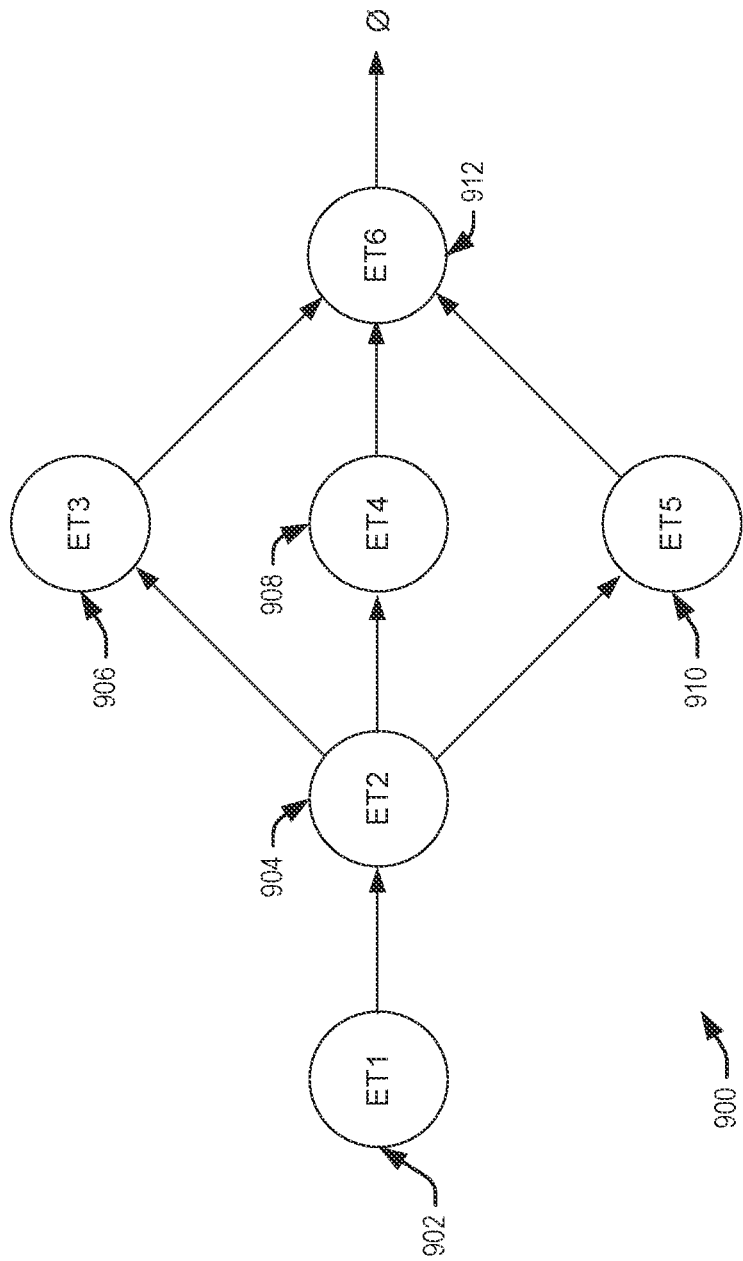
FIG. 9 is an example data structure that may be generated by a cloud infrastructure orchestration service (CIOS) to maintain a list and order associated with one or more execution targets associated with a phase, according to at least one embodiment.

Each node of the linked list 700 may correspond to a data structure configured to identify and maintain an execution order corresponding to one or more execution targets. FIGS. 8 and 9 discuss in more detail the definition and use of such a data structure. It should be appreciated that the linked list 700 may provide the information utilized by the UI 500 of FIG. 5 to present any suitable information associated with a phase (e.g., identifier 516, time stamp information 520, execution target 518, etc.).

FIG. 8 is an example code segment 800 for defining a list and order of execution targets (e.g., execution targets corresponding to a particular phase), according to at least one embodiment. As illustrated in FIG. 8, four execution targets are defined in code segment 800. Each execution target is defined as a resource of type "execution target" and assigned an identifier (e.g., "us-la," "us-sj," "us-sf," and "us-sd"). As illustrated in the code segment 800, the resources 802-808 each correspond with a unique execution target. Each execution target may be associated with one or more variables one of which may include an indicator for indicating an execution order for each phase. In some embodiments, the indicator may indicate one or more dependencies and/or lack of dependency on one or more other execution targets. By way of example, the indicator 818 (e.g., predecessors=[ ] at line 5) may indicate a lack of dependency on any other phase. This can be interpreted by the system as defining a first execution target. The indicator 620 (e.g., predeceesors= [execution_target.us-la.variable 1]) may be utilized to indicate a dependency on another execution (e.g., phase "us-la") through inclusion of an assignment of a value corresponding to a variable associated with another execution target (e.g., execution target "us-la""). Similarly, indicator 822 may indicate a dependency on another phase (e.g., execution target "us-sj" through inclusion of an assignment of a value corresponding to a variable associated with execution target "us-sj") and indicator 624 may indicate a dependency on yet another phase (e.g., execution target "us-sf" through inclusion of an assignment of a value corresponding to a variable associated with execution target "us-sf").

In some embodiments, code segment 800 may be included in a configuration file (e.g., the same or different configuration file that includes the code segment 800) corresponding to a release. The configuration file may be parsed/traversed one or more times as part of executing a preprocessing procedure. In one of these traversals, the code segment 800 may be analyzed to generate a data structure with which the identity and order of execution targets corresponding to a given phase may be maintained. FIG. 9 depicts one example data structure (e.g., a directed acyclic graph (DAG)) which may be utilized to maintain this information.

The indicators 818-824 may be utilized to establish the specific order by which execution targets are to be executed. For example, as depicted in FIG. 8, tasks associated with execution target "us-la" are to be executed first, followed by tasks associated with execution target "us-sj", followed by tasks associated with execution target "us-sf", followed by tasks associated with execution target "us-sd". It should be appreciated that a dependency may indicate one or more other execution targets for which corresponding tasks are to be completed before tasks associated with a given execution target commences. Although four execution targets are defined in FIG. 8, it should be appreciated that any suitable number of phases may be defined in a similar manner. In some embodiments, execution targets may share a common dependency (e.g., identical predecessors definitions). A common dependency may be utilized to indicate that tasks associated with execution targets that share the common dependency may be executed concurrently.

FIG. 9 is an example data structure (e.g., a directed acyclic graph (DAG) 900) that may be generated by a cloud infrastructure orchestration service (CIOS) to maintain a list and order associated with one or more execution targets associated with a phase, according to at least one embodiment, according to at least one embodiment. The DAG 900 may be one of multiple DAGs generated in response to one or more parses by CIOS of a configuration file associated with the release. Each node of the DAG 900 may correspond with a single execution target. As illustrated in FIG. 9, the DAG 900 includes six nodes (e.g., nodes 902, 904, 906, 908, 910, and 912) that may each correspond to one of six execution targets defined in a similar manner as described with respect to code segment 800 of FIG. 8. Each node of the DAG 900 may correspond to a data object that is configured to store any suitable information corresponding to a given execution target. By way of example, a given node may store any suitable number of variables, identifiers, data structures, pointers, references, etc. corresponding to a particular execution target.

Each node of the DAG 900 may include a pointer/reference to one or more nodes in the DAG 90). By way of example, node 902 may include a reference to node 904, which may include references to nodes 906-910, which each may include a reference to node 912, which may indicate (e.g., via a null pointer) that it is the end node of the DAG 900. In some embodiments, these pointers/references may be identified based on indicators similar to indicators 818-824 discussed above in connection with FIG. 8. In some embodiments, nodes 906, 908, and 910 may share a common dependency to node 904, thus the tasks associated with the nodes 906-910 may be executed, at least in part, concurrently. In some embodiments, node 912 may correspond to an execution target that depends on nodes 906-910. Thus, tasks associated with the execution target corresponding to node 912 may be executed only after tasks associated with all of the execution targets corresponding to nodes 906-910 have been completed.

In some embodiments, DAG 900 may be associated with a single node of the linked list 700 discussed above in connection with FIG. 7. That is, one or more execution targets (e.g., identified and represented by the nodes of DAG 900) may be associated with a particular phase (e.g., a single node) of linked list 700. In some embodiments, the node of linked list 700 may include a reference to DAG 900, or one or more nodes of DAG 900 may include a reference to a node of the linked list 700.

In some embodiments, the CIOS may traverse the configuration file (e.g., including code segment 800 of FIG. 8) and generate DAG 900 from this traversal. The generation of DAG 900 may be completed as part of a preprocessing procedure executed before run time or at run time. Upon completing operations corresponding to a given execution target, CIOS may traverse to the next execution target(s), repeating this process any suitable number of times until operations corresponding to one or more end nodes of the DAG 900 (e.g., node 912) have been completed. In some embodiments, if the operations corresponding to a given node are unsuccessful (e.g., produce an error), CIOS may not traverse to the next node and may instead return a notification to alert the user of the situation.

Figure 12:
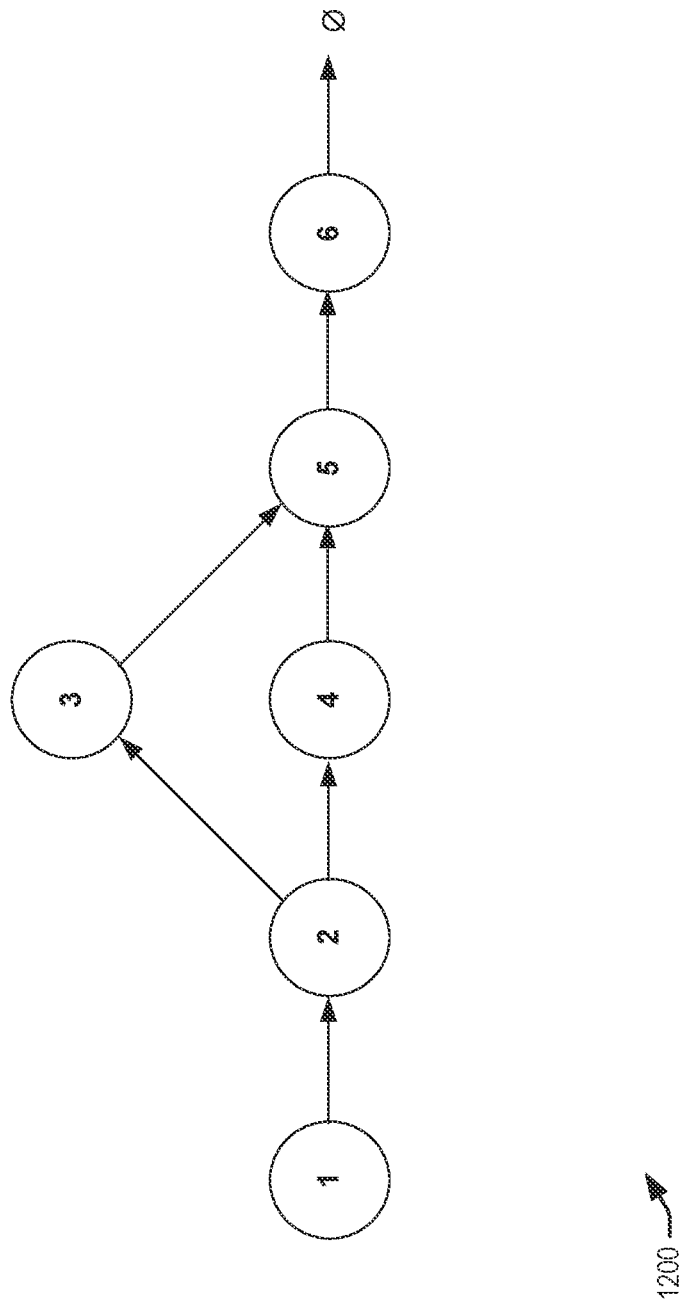
FIG. 12 is an example directed acyclic graph corresponding to resource of a cloud-computing system, according to at least one embodiment.

Each node of the DAG 900 may correspond to a data structure configured to identify and maintain an execution order corresponding to one or more resources (e.g., services, software modules, etc.). FIGS. 10-12 discuss in more detail the definition and use of such a data structure (e.g., a DAG of Capabilities). By way of example, each node of the DAG 900 may correspond to another DAG (e.g., DAG 1200 of FIG. 12, indicating a list and an order of resources and/or capabilities, identifying an order of task execution). It should be appreciated that the DAG 900 may provide the information utilized by the UI 500 of FIG. 5 to present any suitable information associated with the execution target indicators 524-528. Thus, the information depicted in execution target tracking area 522 may depict a simplified version of the DAG 900 (a DAG corresponding to a given phase, such as phase "R_s"). A simplified version of the DAG may condense concurrently executable nodes of the DAG 900 into a single node (e.g., see execution target indicator 528 depicting 12 nodes of a DAG condensed into a single node). In some embodiments, CIOS may deploy infrastructure resources and/or release software artifacts based at least in part on traversing the DAG 900. The specific tasks and order of tasks are identified as described in connection with FIGS. 10-12.

FIG. 10 is an example code segment 1000 for establishing explicit and implicit dependencies between resources of an execution target, according to at least one embodiment. The code segment 1000, as depicted in FIG. 10, includes two modules 1002 and 1004 and a resource 1006. The modules 1002 and 1004 each include names 1008 and 1010 that are shown, respectively, as "apps_example 1," and "apps_example 2." A module may include a name of any suitable length including any suitable alphanumeric character(s). The modules 1002 and 1004 may define applications/services that a user desires to boot or otherwise provision. The modules 1002 and 1004 may be used to deploy applications to availability domain 1 and to availability domain 2, respectively. The resource 1006 can include a multi-parameter list including a resource type 1012 that is shown in FIG. 10 as "type," and a resource name 1014 that is shown in FIG. 10 as "executor". The resource type 1012 may be any type suitable for a deployment, and the resource name 1014 may be any name.

The resource 1006 may be a capability and may include an implicit dependency, an explicit dependency, or both. As depicted in the code segment 1000, the resource 1006 attempts to assign variable "variable1" to a value equal to "module.apps_example1.variable1," a value accessible via the apps_example1 module (e.g., module 1002). This is intended to depict an implicit dependency that is formed between the resource 1006 and the module 1002. The formed implicit dependency may prevent the resource 1006 from executing before the module 1002 has completed deployment. A process responsible for booting the resource 1006 may receive a notification that the module 1002 has completed deployment. The notification may be transmitted by a scheduler (e.g. the scheduler 206 of FIG. 2) and may be received by the process responsible for booting resource 1006. The formed implicit dependency is considered implicit since the resource 1006 as shown in FIG. 10 does not directly defining a dependency between the module 1002 and the resource 1006.

In contrast, the resource 1006 includes an explicit dependency at line 29 of FIG. 10 which includes explicitly defining a dependency between resource 1006 and the app_example 2 module. As depicted in the code segment 1000 at line 29, the resource 1006 includes "depends_on=apps_example 2.variable2." Based on the code at line 29, an explicit dependency may be formed, and the explicit dependency may prevent the resource 1006 from being deployed until apps_example 2 has successfully deployed. Upon successful deployment of apps_example 2, a notification may be transmitted by the scheduler and may be received by a process responsible for deploying the resource 1006. While the code segment 1000 of FIG. 10 includes one resource 1006 that includes one implicit dependency and one explicit dependency, it should be appreciated by one of ordinary skill that any combination of resources 1006, implicit dependencies, and explicit dependencies may be used to achieve a goal of a user of CIOS.

CIOS (or a declarative infrastructure provisioner such as the declarative provisioning tool of CIOS, discussed above) may be utilized to parse the configuration file including code segment 1000. Through this parse, CIOS (or the declarative provisioning provisioner) may generate a directed acyclic graph (DAG) for each resource, module, and/or capability that compiles and defines an ordered list of dependencies on other resources, modules, and/or capabilities. While attempting to deploy a resource, CIOS may traverse the DAG to identify when a resource is dependent on another resource, module, and/or capability. The DAG for each resource may specify implicit dependencies, explicit dependencies, or a combination thereof and may be used for booting or otherwise deploying the corresponding resource with CIOS.

FIG. 11 is an example code segment 1100 for establishing explicit and implicit dependencies between resources of an execution target, according to at least one embodiment. The code segment 1100 as illustrated in FIG. 11 includes four resources 1102, 1104, 1106, and 1108. Each resource of the resources 1102, 1104, 1106, and 1108 may correspond to a capability and may include implicit dependencies, explicit dependencies, or a combination thereof.

The resource 1102 as shown in FIG. 11 includes a name 1110, shown as "object_storage," a type 1112, shown as "type1," (e.g., indicating the resource is a capability) and a number of variables (e.g., variables 1-3, although more or fewer variables may be utilized). The resource 1104 as shown in FIG. 11 includes a name 1116, shown as "worker," and an explicit dependency 1118, shown as "depends_on=type1.object_storage." The parameter list of resource 1102 includes an identifier 1115 which may be used to refer to that resource (or the name 1110 may be utilized similarly). The statement 1118 forms an explicit dependency on resource 1102 due to the reference to type1.object_storage. This explicit dependency may prevent the resource 1104 from being deployed until the resource 1102 completes deployment. The resource 1106 as shown in FIG. 11 includes an identifier 1120, shown as "peacock," a type (e.g., "type1" indicating a capability) and a number of variables (e.g., variable1 and variable2). The resource 1108 as shown in FIG. 11 includes a type (e.g., "type4"), a name 1124, shown as "LB," and statement 1126 ("count=type1.peacock.exists."). The use of statement 1126 may form an implicit dependency on resource 1106. Although resource 1108 does not use the explicit dependency construct (e.g., "depends_on"), an implicit dependency none-the-less exists due to an attempt to assign the variable "count" a value equal to whether the capability "peacock" exists (as determined from the statement type1.peacock.exists). Thus, the resource 1108 may not be deployed until the resource 1106 "peacock" deploys due to the assignment attempted at line 18. While the code segment 1100 of FIG. 11 includes four resources 1102, 1104, 1106, and 1108, which include one implicit dependency and one explicit dependency, it should be appreciated by one of ordinary skill in the relevant art that any combination of resources, implicit dependencies, and explicit dependencies may be used to achieve a goal of a user of CIOS.

CIOS (or a declarative infrastructure provisioner such as the declarative provisioning tool of CIOS discussed above) may be utilized to parse the configuration file including code segment 1100. Through this parse, CIOS (or the declarative provisioning provisioner) may generate a directed acyclic graph (DAG) for each resource, module, and/or capability that compiles and defines an ordered list of dependencies on other resources, modules, and/or capabilities. While attempting to deploy a resource, CIOS may traverse the DAG to identify when a resource is dependent on another resource, module, and/or capability of another resource. The DAG for each resource may specify implicit dependencies, explicit dependencies, or a combination thereof and may be used for booting or otherwise deploying the corresponding resource with CIOS.

FIG. 12 is an example directed acyclic graph (DAG) 1200 corresponding to resource (e.g., resource A) of a cloud-computing system, according to at least one embodiment. As depicted, the DAG 1200 may be a finite directed graph that includes any suitable number of nodes (e.g., six nodes as shown in FIG. 12) and edges (e.g., seven edges as shown in FIG. 12), with each edge being directed from one node to another as depicted in FIG. 12. The nodes and edges may be arranged to avoid directed cycles. That is, the DAG 1200 is arranged such that there is no way to start at any node and follow a consistently directed sequence of edges that eventually loop back to that same node. A last node (e.g., node "6"), may point to a null value or otherwise indicate an end to the DAG.

Although DAG 1200 depicts six nodes and seven edges, a DAG may include any suitable number of nodes and directed edges. In some embodiments, each node corresponds to a set of operations (e.g., operations for performing a task such as deploying and/or booting a resource such as resource A) or a set of capabilities on which a next node of operations depends. The directed edges of each DAG define an order by which these operations are to be executed and/or a dependency between a subset of operations associated with a node and a subset of capabilities associated with an immediately preceding that node.

As a simplistic example, nodes 1, 2, 5, 6, of DAG 1200 are intended to depict nodes corresponding to four separate sets of operations. Based on the edges depicted in FIG. 1200, the operations of each node are to be executed in the order corresponding to the order of nodes 1, 2, 5, and 6. Nodes 3 and 4 are intended to depict nodes that individually correspond with one or more dependencies. By way of example, node 3 may correspond to a dependency of operations corresponding to node 5 on a capability associated with a different resource (e.g., resource B). Similarly, node 4 may correspond to a dependency of operations corresponding to node 5 on a capability associated with a different resource (e.g., resource C). In some embodiments, different capability nodes (e.g., a node identifying a dependency on a particular resource's capability/capabilities) may be used for different resources, or a single node may be utilized to specify all dependencies regardless of how many resources to which the dependencies refer. Thus, in some embodiments, the dependency corresponding to resource B (e.g., identified in node 3) and the dependency corresponding to resource C (e.g., identified in node 4) may be combined in a single node.

The DAG 1200 may be traversed in the manner described in more detail with respect to FIGS. 10-12 to orchestrate the execution of operations for booting and/or deploying a resource in a cloud-computing environment with respect to one or more dependencies on capabilities of other resources (or other resources themselves).

Figure 13:
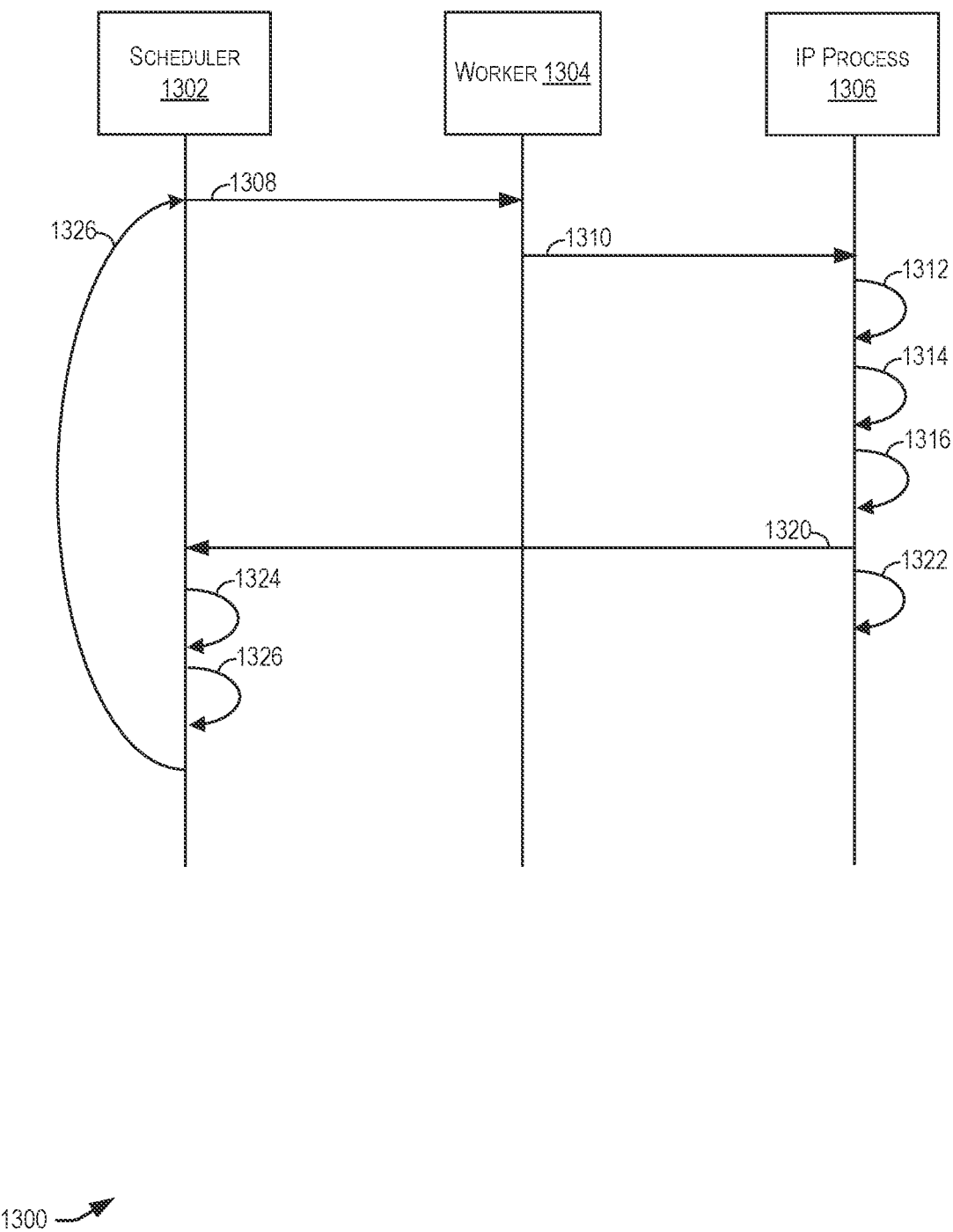
FIG. 13 is a flow diagram illustrating an example process for orchestrating the execution of a task that includes a dependency on at least one capability, according to at least one embodiment.

FIG. 13 is a flow diagram illustrating an example process 1300 for orchestrating the execution of a task (e.g., deploying a resource) that includes a dependency on at least one capability (e.g., a capability of a different resource), according to at least one embodiment. As illustrated in FIG. 13, the process flow 1300 includes a scheduler 1302 (e.g. the scheduler 206 of FIG. 2), a worker 1304 (e.g. the worker 210 of FIG. 2), and an IP process 1306 (e.g. the CIOS container 212 of FIG. 2).

At 1308, the scheduler 1302 may receive a task for deploying infrastructure resources in a region, and the scheduler 1302 may transmit data pertaining to the task to the worker 1304. In some embodiments, the scheduler 1302 may instantiate the worker 1304 to handle deployment of a resource (e.g., a service).

At 1310, the worker 1304 may instantiate IP process 1306 which may be configured to execute an instance of a declarative infrastructure provisioner (e.g., the declarative provisioning tool, Terraform, discussed above).

At 1312, the IP process 1306 may parse a configuration file (e.g., a configuration file that includes code segments 1000 and/or 1100 of FIGS. 10 and 11) associated with the deployment to generate a directed acyclic graph (DAG) for a particular resource. Through parsing the configuration, the IP process 1306 (the declarative infrastructure provisioner) may identify any suitable number of implicit and/or explicit dependencies on capabilities of other resources. Once identified, the IP process 1306 builds a DAG that specifies tasks for booting and/or deploying a resource with potentially one or more nodes that correspond to a capability on which the resource depends (e.g., in accordance with the implicit and/or explicit dependencies identified during the parsing).

At 1314, the IP process 1306 may begin traversing the DAG, executing at least a portion of the deployment and/or booting of the particular resource as various nodes of the DAG are reached. In accordance with at least one node of the DAG, any suitable operations may be executed to cause a portion of functionality corresponding to the resource to become available. It may be that multiple portions of functionality corresponding to the resource become available. In some embodiments, the IP process 1306 may transmit to the scheduler 1302 a notification indicating one or more capabilities of the resource is now available (not depicted). At least one of the nodes of the DAG may correspond to a capability of one or more other resources. When these types of nodes are reached, the IP process 1306 may check to see if the capability is available. If so, the IP process 1306 may proceed with its traversal of the DAG.

At 1316, the IP process 1306 may reach a node of the DAG that corresponds to a one or more capabilities of one or more other resources. In some embodiments, the IP process 1306 may determine that at least one capability associated with the node is not yet available.

At 1320, in response to determining at least one capability associated with the node is unavailable, the IP process 1306 may transmit data to the scheduler 1302 indicating the one or more capabilities on which the resource corresponding to the IP process 1306 depends which have been determined to be unavailable.

At 1322, the IP process 1306 may exit after potentially storing state information indicating what operations and/or node of the DAG have already been completed and/or at what particular node of the DAG the IP process 1306 was last accessing. The IP process 1306 exits, is killed, is suspended, or otherwise ceases to execute.

At 1324, the scheduler 1302 may store information indicating that the particular resource was awaiting one or more particular capabilities which are needed for the resource to resume booting and/or for deployment purposes.

At 1326, the scheduler 1302 may receive one or more notifications that the one or more capabilities for which the resource was waiting have become available. In some embodiments, the scheduler 1302 may receive various notification from other IP processes indicating various capabilities of corresponding resources as those capabilities become available. The scheduler 1302 may maintain one or more records of the various capabilities that are available and/or of the various capabilities for which resources are currently waiting. The scheduler 1302 may identify from the one or more records that the particular capability/capabilities for which the resource corresponding to IP process 1306 is waiting have become available. Accordingly, the scheduler 1302 may proceed to 1328.

At 1328, in response to determining that the capabilities on which the resource corresponding to IP process 1306 depends have become available, the scheduler 1302 may return to step 1308, where it transmits data pertaining to the original task (e.g., deploying the resource) to the worker 1304. In some embodiments, the scheduler 1302 may instantiate a new worker or utilize the previous worker 1304 (as depicted) to continue handling the task associated with the resource. The worker 1304 may instantiate IP process (not depicted) which may be configured to execute parse the configuration file to generate the DAG for the resource. The IP process may access the stored state information to identify the node that was last access in the DAG (e.g., the node corresponding to the one or more capabilities for which the resource was waiting). Since the one or more capabilities are now available, the IP process may proceed with its traversal of the DAG in a similar manner as discussed above, executing operations at each node either execute a portion of the task or check for capabilities on which a next portion of the task depends, until the operations of the end node of the DAG have been completed.

A similar process as discussed above may be performed for every resource of the task. By way of example, when deploying a system with multiple resources (e.g., multiple services), the process 1300 may be performed on behalf of each resource in order to deploy each resource in the system.

Figure 14:
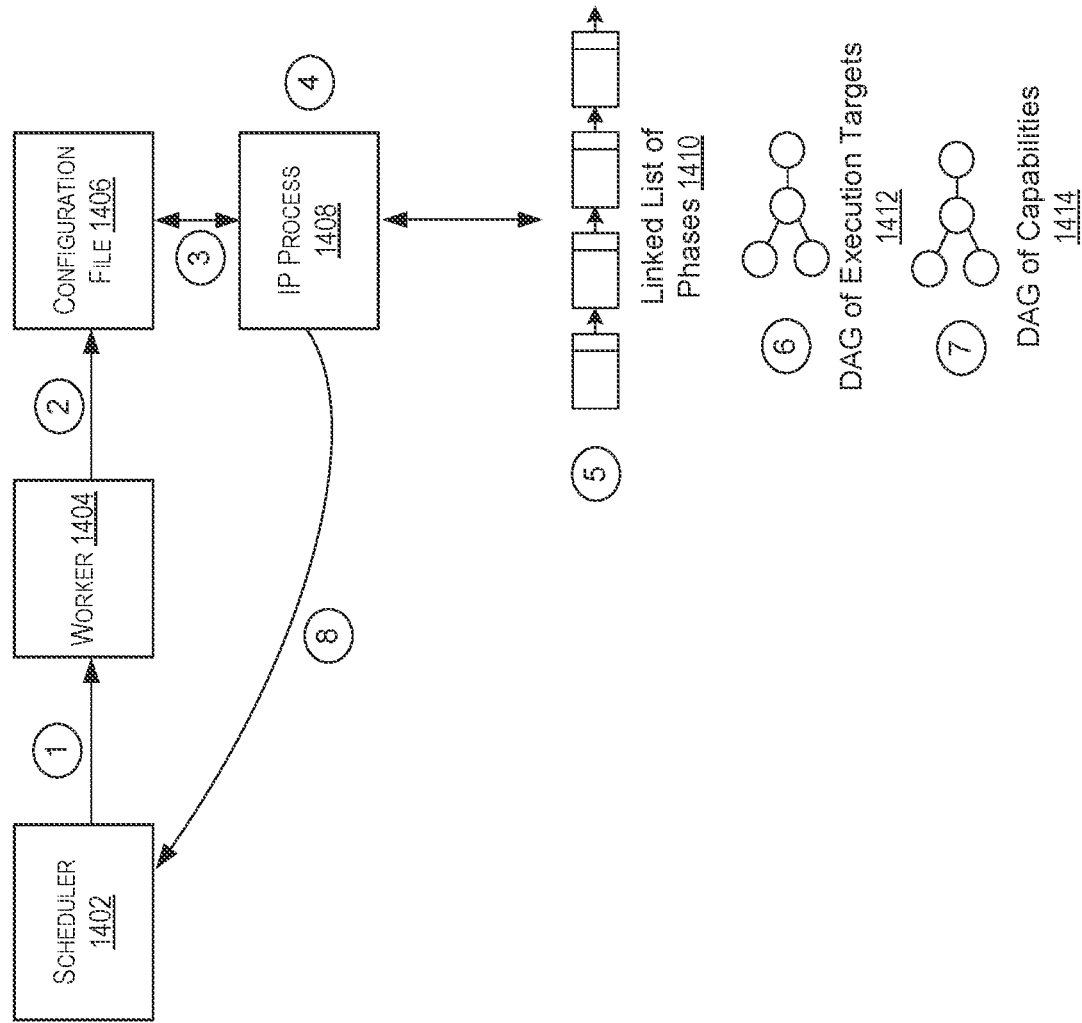
FIG. 14 is an example process flow of computer infrastructure orchestration service traversing a linked list, an execution target directed acyclic graph, and a capability directed acyclic graph, according to at least one embodiment.

FIG. 14 is an example process flow 1400 for executing a release (e.g., by CIOS), according to at least one embodiment. At event number one, a scheduler 1402 (e.g. the scheduler 206 of FIG. 2) may send a task to a worker 1404 (e.g. the worker 210 of FIG. 2). The task may include deploying a computing system or a subset thereof such as deploying infrastructure resources to a set of execution targets. The task may involve traversing a linked list (e.g., an example of linked list 700 of FIG. 7), a DAG (e.g., DAGS 900 and 1200 of FIGS. 9 and 12, respectively), a combination thereof, or any other suitable task for deploying the computing system. The worker 1404 may receive the task from the scheduler 206. The worker 1404 may be one worker node in a fleet of worker nodes. The fleet of worker nodes may include any suitable number of worker nodes for deploying the computing system. The worker 1404 may be chosen by the scheduler 1402 based, at least in part, on a capacity of the worker 1404. For example, the scheduler 1402 may choose to send the task to the worker 1404 if the worker 1404 has the most amount of computing capacity in the fleet of worker nodes.

At event number 2, the worker 1404 may perform one or more parses/traversals of a configuration file 1406. The configuration file 1406 may include instructions for deploying the computing system, and performing the one or more parses may result in identification of resources or other capabilities that are desired to be booted or otherwise deployed for deploying the computing system. As a non-limiting example, the configuration file 1406 may include code segments 600, 800, 1000 and 1100 of FIGS. 6, 8, 10, and 11, respectively.

At event number 3, information from the configuration file 1406 may be transmitted to an IP Process 1408 (e.g. the IP Process 212 of FIG. 2). The IP Process 1408 may receive information from the configuration file 1406 based on the one or more parses/traversals performed by the worker 1404. The information may include a set of capabilities, execution targets, or any other suitable resources for deploying the computing system.

At event number 4, in response to receiving the information from the configuration file 1406, the IP Process 1408 may determine an order in which capabilities or any other suitable resources for deploying the computing system are to be deployed. The IP Process 1408 may generate linked list of phases 1410 (e.g. an example of linked list 700 of FIG. 7), DAG of execution targets 1412 (e.g. an example of DAG 900 of FIG. 9), DAG of capabilities 1414 (e.g. an example of DAG 1200 of FIG. 12), or any other suitable list, graph, or data structure. The linked list 1410, DAG of execution targets 1412, and DAG of capabilities 1414 (collectively referred to as "the release data structures") may be generated in any suitable order.

The release data structures may be utilized to identify and determine an order for executing tasks of a release. For example, each node of linked list of phases 1410 corresponds to a separate instance of a DAG of execution targets (e.g., an example of DAG of execution targets 1412), where each node of the DAG of execution targets corresponds to a DAG of capabilities (e.g., an example of DAG of capabilities 1414). IP process 1408 may begin at a first node of the linked list 1400, to identify a corresponding DAG of execution targets. The first node of the DAG of execution targets may be utilized to identify a corresponding DAG of capabilities. The tasks associated with that DAG of capabilities may be executed in accordance with the DAG of capabilities and upon completion, IP process 1408 may traverse to the next node of the DAG of execution targets to identify the next corresponding DAG of capabilities. Each node of the DAG of execution target may be traversed and, when the tasks corresponding to those nodes are completed, IP process 1408 may then traverse to the next node of linked list 1400 to identify the next phase. This process may be repeated any suitable number of times until all of the tasks associated with each of the execution targets associated with the last phase of the release have been completed.

By way of example, at event number 5, a first node of the linked list of phases 1410 is reached. The IP Process 1408 identify a DAG of execution targets corresponding to the first node.

At event number 6, the first node of the DAG of execution targets 1412 is reached. The DAG of capabilities 1414 may be identified based at least in part on being associated with the first node of the DAG of execution targets 1412.

At event number 7, tasks for a given execution target are executed based at least in part on traversing the DAG of capabilities 1414. When those tasks have been completed, the IP process 1408 may traverse to the next node of the DAG of execution targets, determine a corresponding DAG of capabilities, and execute the tasks according to traversing that DAG of capabilities. This process may proceed until the tasks associated with the last node of the DAG of execution targets 1412 have been executed. The IP process 1408 may then traverse to the next node of the linked list of phases 1410. The operations of event number 5-7 may be repeated any suitable number of times until all of the tasks associated with all of the execution targets associated with the last node of the linked list of phases 1410 have been executed. Upon completing a task, an execution target, and/or a phase, the IP process 1408 may update or cause an update to the UI 500 of FIG. 5 to depict a current state of a task, an execution target, and/or a phase.

At event number 8, the IP Process 1408 transmits a signal to the scheduler 1402 that traversal of the release is complete. The scheduler 1402 may receive the signal from the IP Process 1408 and may broadcast a notification that the computing system is ready for use.

Figure 15:
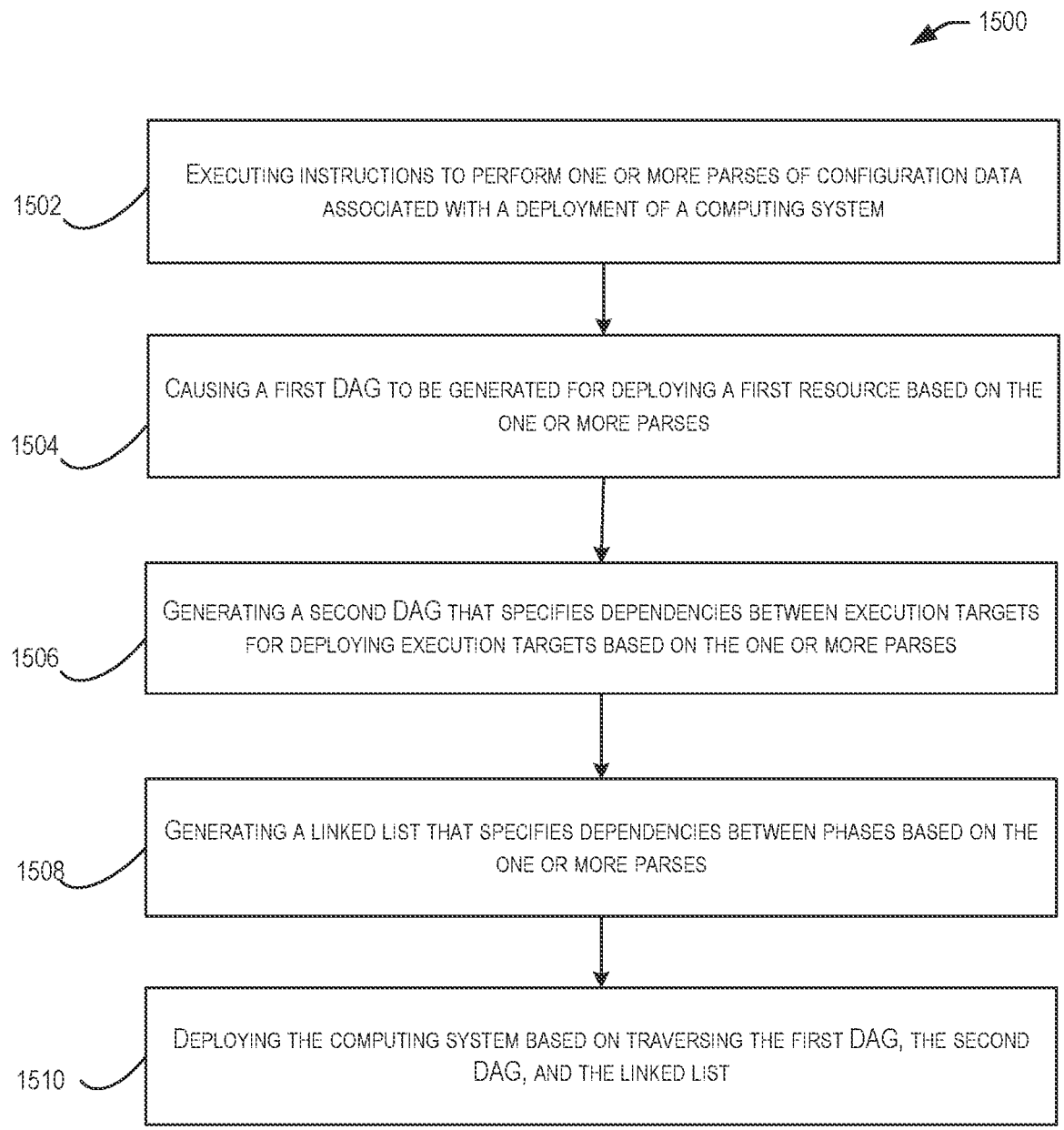
FIG. 15 is a flow chart of a process for deploying a computing system using directed acyclic graphs in a computer infrastructure orchestration service, according to at least one embodiment.

FIG. 15 is a flow chart of a process 1500 for deploying a computing system using DAGs in CIOS, according to at least one embodiment. At block 1502, CIOS may execute instructions for performing one or more parses of configuration data associated with a deployment of a computing system. The configuration data may be included in a configuration file, and in performing the one or more parses of the configuration data, CIOS may determine a set of tasks to perform to deploy the computing system. Tasks included in the set of tasks may include deploying infrastructure resources at execution targets or any other suitable tasks for deploying the computing system.

At block 1504, CIOS causes a first DAG (e.g. the DAG 1200 of FIG. 12) to be generated for deploying resources based on the configuration file. The first DAG may be a DAG of capabilities that may outline a certain order for capabilities to be booted or otherwise deployed. The first DAG may include any suitable number of tasks for deploying capabilities and may include any suitable number of dependencies between the capabilities to be deployed.

At block 1506, CIOS generates a second DAG (e.g. the DAG 900 of FIG. 9) that defines dependencies between execution targets for deploying execution targets based on the configuration file. The second DAG may a DAG of execution targets that specifies an order to which execution targets are deployed. The second DAG may include any suitable number of execution targets for deploying the computing system and may include any suitable number of dependencies for deploying execution targets.

At block 1508, CIOS generates a linked list (e.g. the linked list 700 of FIG. 7) that specifies dependencies between phases based on the configuration file. The phases may include the first DAGs, the second DAGs, or a combination thereof, and the linked list may define an order in which the phases are executed. The phases of the linked list may be executed in series and may not include and phases to be executed in parallel. The linked list may include any suitable number of phases for deploying the computing system.

At block 1510, CIOS deploys the computing system by traversing the first DAG, the second DAG, and the linked list. CIOS may traverse the linked list, and the first DAG and the second DAG may be traversed concurrently (i.e. the first DAG and the second DAG may be included in the linked list). A successful traversal of the linked list, the first DAG, and the second DAG may result in a successful deployment of the computing system.

Illustrative Systems

Figure 16:
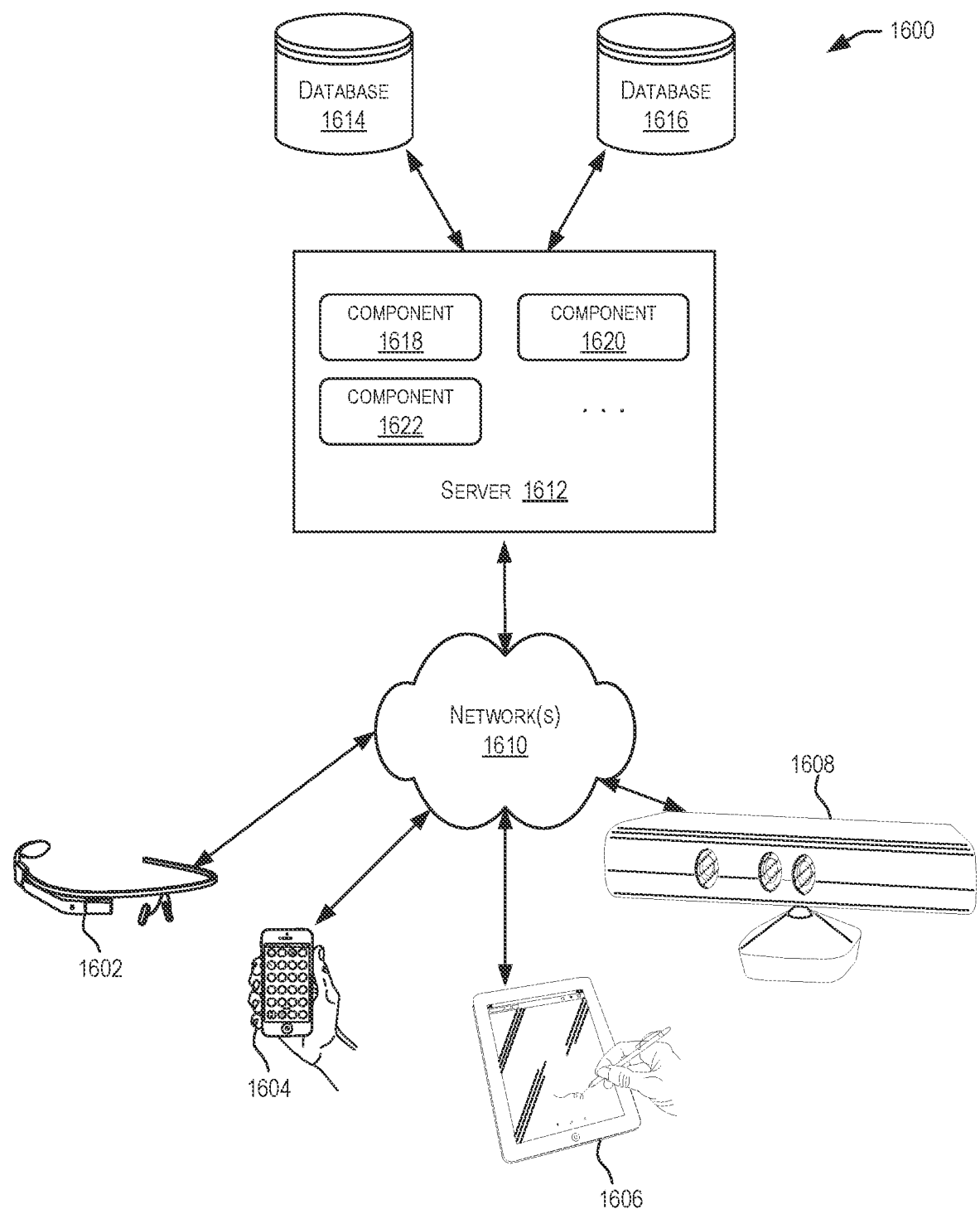
FIG. 16 is a block diagram of a distributed system, according to at least one embodiment.
Figure 17:
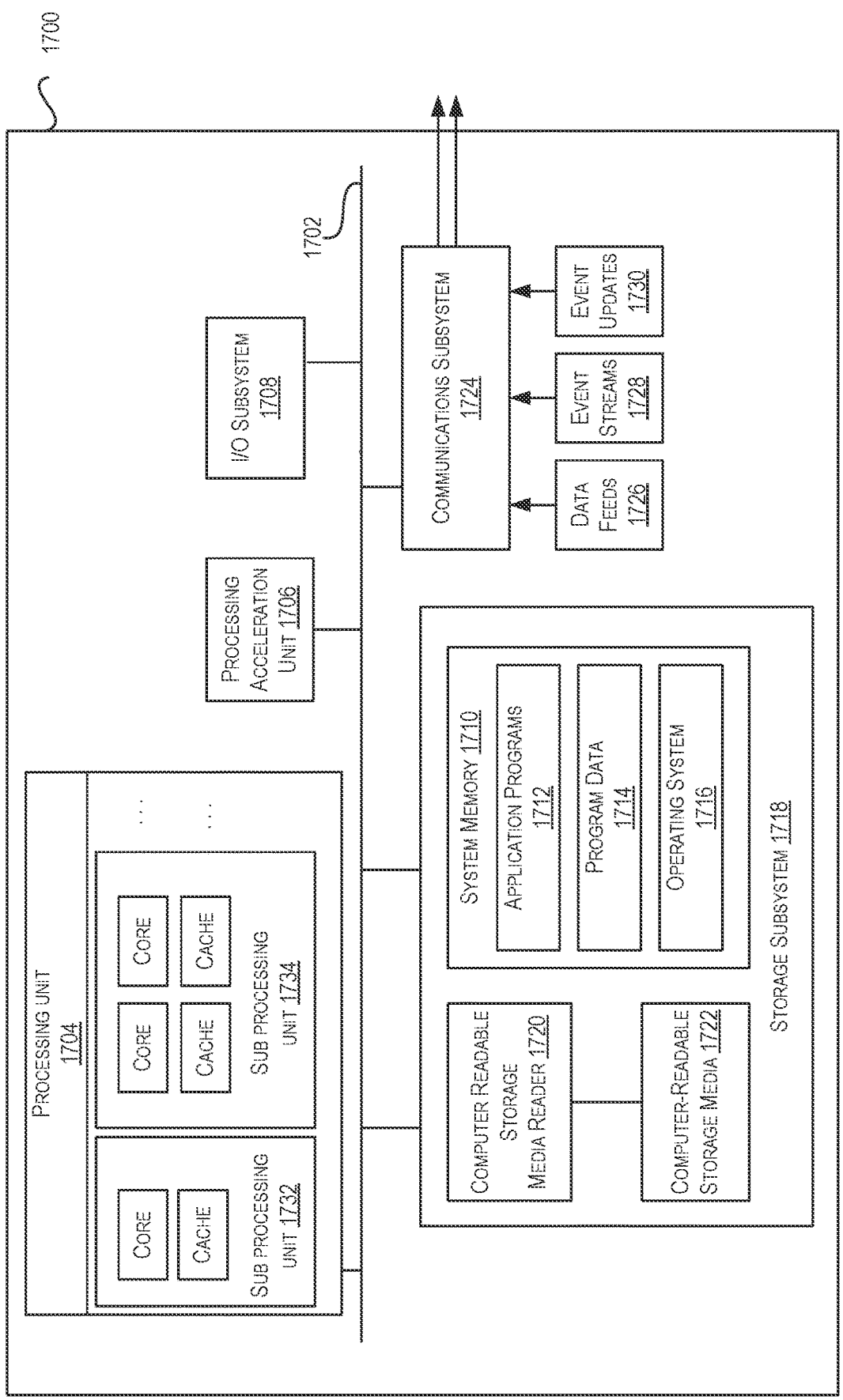
FIG. 17 is a block diagram of one or more components of a system environment by which services provided by one or more components of an embodiment system may be offered as cloud services, according to at least one embodiment.
Figure 18:
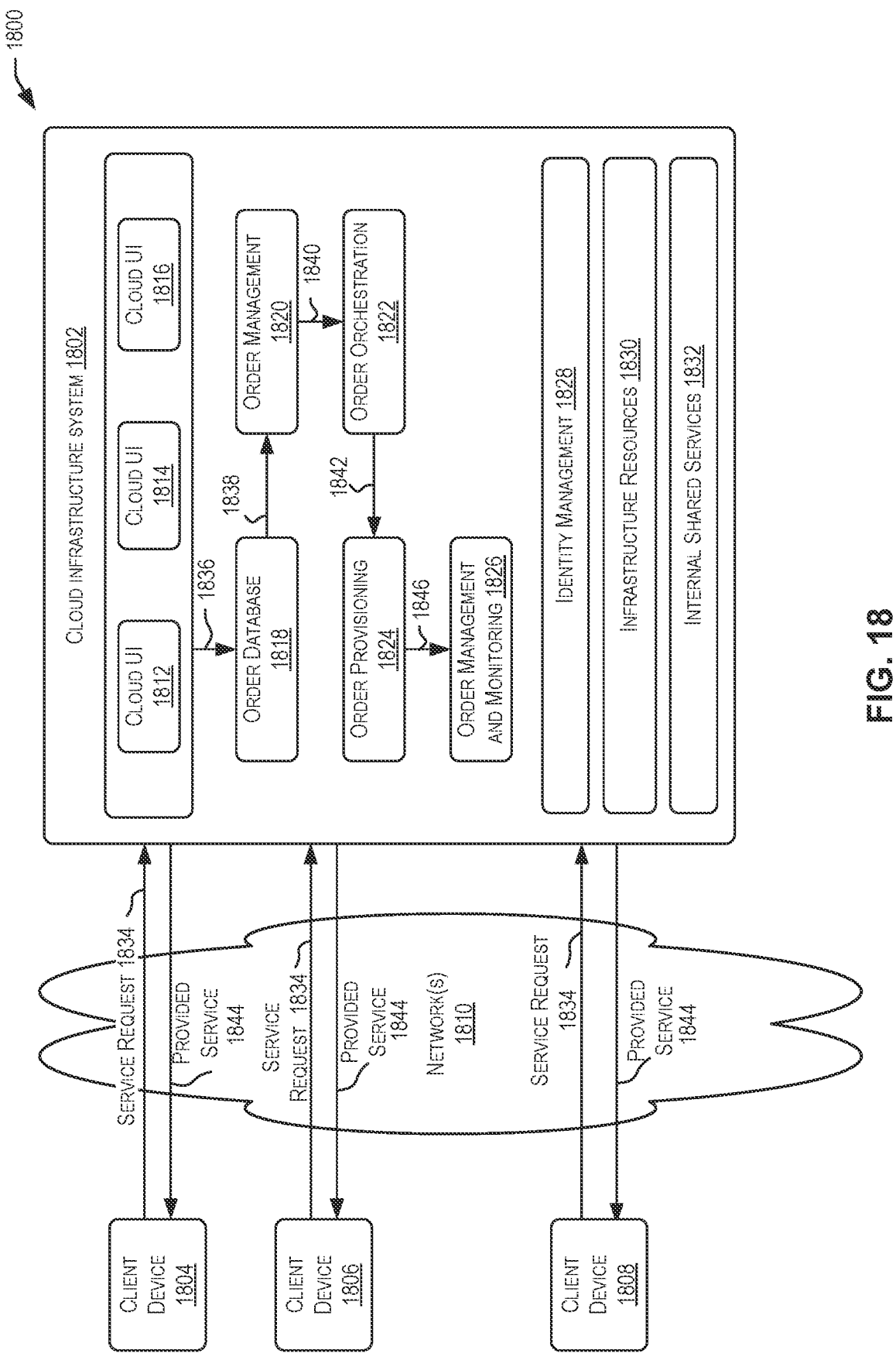
FIG. 18 is a block diagram of an example computer system, in which various embodiments of the present disclosure may be implemented.

FIGS. 16-18 illustrate aspects of example environments for implementing aspects of the present disclosure in accordance with various embodiments. FIG. 16 depicts a simplified diagram of a distributed system 1600 for implementing an embodiment of the present disclosure. In the illustrated embodiment, the distributed system 1600 includes one or more client computing devices 1602, 1604, 1606, and 1608, which are configured to execute and operate a client application such as a web browser, proprietary client (e.g., Oracle Forms), or the like over one or more network(s) 1610. The server 1612 may be communicatively coupled with the remote client computing devices 1602, 1604, 1606, and 1608 via network 1610.

In various embodiments, the server 1612 may be adapted to run one or more services or software applications such as services and applications that provide identity management services. In certain embodiments, the server 1612 may also provide other services or software applications can include non-virtual and virtual environments. In some embodiments, these services may be offered as web-based or cloud services or under a Software as a Service (SaaS) model to the users of the client computing devices 1602, 1604, 1606, and/or 1608. Users operating the client computing devices 1602, 1604, 1606, and/or 1608 may in turn utilize one or more client applications to interact with the server 1612 to utilize the services provided by these components.

In the configuration depicted in FIG. 16, the software components 1618, 1620 and 1622 of system 1600 are shown as being implemented on the server 1612. In other embodiments, one or more of the components of the system 1600 and/or the services provided by these components may also be implemented by one or more of the client computing devices 1602, 1604, 1606, and/or 1608. Users operating the client computing devices may then utilize one or more client applications to use the services provided by these components. These components may be implemented in hardware, firmware, software, or combinations thereof. It should be appreciated that various different system configurations are possible, which may be different from distributed system 1600. The embodiment shown in FIG. 16 is thus one example of a distributed system for implementing an embodiment system and is not intended to be limiting.

The client computing devices 1602, 1604, 1606, and/or 1608 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 1610.

Although distributed system 1600 in FIG. 16 is shown with four client computing devices, any number of client computing devices may be supported. Other devices, such as devices with sensors, etc., may interact with the server 1612.

The network(s) 1610 in the distributed system 1600 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 1610 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.16 suite of protocols, Bluetooth®, and/or any other wireless protocol), and/or any combination of these and/or other networks.

The server 1612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 1612 can include one or more virtual machines running virtual operating systems, or other computing architectures involving virtualization. One or more flexible pools of logical storage devices can be virtualized to maintain virtual storage devices for the server. Virtual networks can be controlled by the server 1612 using software defined networking. In various embodiments, the server 1612 may be adapted to run one or more services or software applications described in the foregoing disclosure. For example, the server 1612 may correspond to a server for performing processing as described above according to an embodiment of the present disclosure.

The server 1612 may run an operating system including any of those discussed above, as well as any commercially available server operating system. Server 1612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Example database servers include without limitation those commercially available from Oracle, Microsoft, Sybase, IBM (International Business Machines), and the like.

In some implementations, the server 1612 may include one or more applications to analyze and consolidate data feeds and/or event updates received from users of the client computing devices 1602, 1604, 1606, and 1608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 1612 may also include one or more applications to display the data feeds and/or real-time events via one or more display devices of the client computing devices 1602, 1604, 1606, and 1608.

The distributed system 1600 may also include one or more databases 1614 and 1616. These databases may provide a mechanism for storing information such as user identity information, and other information used by embodiments of the present disclosure. Databases 1614 and 1616 may reside in a variety of locations. By way of example, one or more of databases 1614 and 1616 may reside on a non-transitory storage medium local to (and/or resident in) the server 1612. Alternatively, the databases 1614 and 1616 may be remote from the server 1612 and in communication with the server 1612 via a network-based or dedicated connection. In one set of embodiments, the databases 1614 and 1616 may reside in a storage-area network (SAN). Similarly, any necessary files for performing the functions attributed to the server 1612 may be stored locally on the server 1612 and/or remotely, as appropriate. In one set of embodiments, the databases 1614 and 1616 may include relational databases, such as databases provided by Oracle, that are adapted to store, update, and retrieve data in response to SQL-formatted commands.

FIG. 17 illustrates an example computer system 1700 that may be used to implement an embodiment of the present disclosure. In some embodiments, computer system 1700 may be used to implement any of the various servers and computer systems described above. As shown in FIG. 17, computer system 1700 includes various subsystems including a processing subsystem 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 may include tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1704 controls the operation of computer system 1700 and may comprise one or more processing units 1732, 1734, etc. A processing unit may include be one or more processors, including single core or multicore processors, one or more cores of processors, or combinations thereof. In some embodiments, processing subsystem 1704 can include one or more special purpose co-processors such as graphics processors, digital signal processors (DSPs), or the like. In some embodiments, some or all of the processing units of processing subsystem 1704 can be implemented using customized circuits, such as application specific integrated circuits (ASICs), or field programmable gate arrays (FPGAs).

In some embodiments, the processing units in processing subsystem 1704 can execute instructions stored in system memory 1710 or on computer readable storage media 1722. In various embodiments, the processing units can execute a variety of programs or code instructions and can maintain multiple concurrently executing programs or processes. At any given time, some or all of the program code to be executed can be resident in system memory 1710 and/or on computer-readable storage media 1710 including potentially on one or more storage devices. Through suitable programming, processing subsystem 1704 can provide various functionalities described above for dynamically modifying documents (e.g., webpages) responsive to usage patterns.

In certain embodiments, a processing acceleration unit 1706 may be provided for performing customized processing or for off-loading some of the processing performed by processing subsystem 1704 so as to accelerate the overall processing performed by computer system 1700.

I/O subsystem 1708 may include devices and mechanisms for inputting information to computer system 1700 and/or for outputting information from or via computer system 1700. In general, use of the term "input device" is intended to include all possible types of devices and mechanisms for inputting information to computer system 1700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1718 provides a repository or data store for storing information that is used by computer system 1700. Storage subsystem 1718 provides a tangible non-transitory computer-readable storage medium for storing the basic programming and data constructs that provide the functionality of some embodiments. Software (programs, code modules, instructions) that when executed by processing subsystem 1704 provide the functionality described above may be stored in storage subsystem 1718. The software may be executed by one or more processing units of processing subsystem 1704. Storage subsystem 1718 may also provide a repository for storing data used in accordance with the present disclosure.

Storage subsystem 1718 may include one or more non-transitory memory devices, including volatile and non-volatile memory devices. As shown in FIG. 17, storage subsystem 1718 includes a system memory 1710 and a computer-readable storage media 1722. System memory 1710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1700, such as during start-up, may be stored in the ROM. The RAM may contain data and/or program modules that are presently being operated and executed by processing subsystem 1704. In some implementations, system memory 1710 may include multiple different types of memory, such as static random access memory (SRAM) or dynamic random access memory (DRAM).

By way of example, and not limitation, as depicted in FIG. 17, system memory 1710 may store application programs 1712, which may include client applications, Web browsers, mid-tier applications, relational database management systems (RDBMS), etc., program data 1714, and an operating system 1716. By way of example, operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1722 may store programming and data constructs that provide the functionality of some embodiments. Software (programs, code modules, instructions) that when executed by processing subsystem 1704 a processor provide the functionality described above may be stored in storage subsystem 1718. By way of example, computer-readable storage media 1722 may include non-volatile memory such as a hard disk drive, a magnetic disk drive, an optical disk drive such as a CD ROM, DVD, a Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1722 may provide storage of computer-readable instructions, data structures, program modules, and other data for computer system 1700.

In certain embodiments, storage subsystem 1700 may also include a computer-readable storage media reader 1720 that can further be connected to computer-readable storage media 1722. Together and, optionally, in combination with system memory 1710, computer-readable storage media 1722 may comprehensively represent remote, local, fixed, and/or removable storage devices plus storage media for storing computer-readable information.

In certain embodiments, computer system 1700 may provide support for executing one or more virtual machines. Computer system 1700 may execute a program such as a hypervisor for facilitating the configuring and managing of the virtual machines. Each virtual machine may be allocated memory, compute (e.g., processors, cores), I/O, and networking resources. Each virtual machine may run its own operating system, which may be the same as or different from the operating systems executed by other virtual machines executed by computer system 1700. Accordingly, multiple operating systems may potentially be run concurrently by computer system 1700. Each virtual machine generally runs independently of the other virtual machines.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to establish a communication channel to one or more client devices via the Internet for receiving and sending information from and to the client devices. Additionally, communication subsystem 1724 may be used to communicate notifications of successful logins or notifications to re-enter a password from the privileged account manager to the requesting users.

Communication subsystem 1724 may support both wired and/or wireless communication protocols. For example, in certain embodiments, communications subsystem 1724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1724 can provide wired network connectivity (e.g., Ethernet) in addition to or instead of a wireless interface.

Communication subsystem 1724 can receive and transmit data in various forms. For example, in some embodiments, communications subsystem 1724 may receive input communication in the form of structured and/or unstructured data feeds 1726, event streams 1728, event updates 1730, and the like. For example, communications subsystem 1724 may be configured to receive (or send) data feeds 1726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1724 may be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1700 depicted in FIG. 17 is intended only as a specific example. Many other configurations having more or fewer components than the system depicted in FIG. 17 are possible. Based on the disclosure and teachings provided herein, a person of ordinary skill in the art will appreciate other ways and/or methods to implement the various embodiments.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, California, may offer various types of cloud services including but not limited to one or more services provided under Software as a Service (SaaS) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services may facilitate the management and control of the underlying computing resources, such as storage, networks, and other fundamental computing resources for customers utilizing services provided by the SaaS platform and the PaaS platform.

FIG. 18 is a simplified block diagram of one or more components of a system environment 1800 by which services provided by one or more components of an embodiment system may be offered as cloud services, in accordance with an embodiment of the present disclosure. In the illustrated embodiment, system environment 1800 includes one or more client computing devices 1804, 1806, and 1808 that may be used by users to interact with a cloud infrastructure system 1802 that provides cloud services. The client computing devices may be configured to operate a client application such as a web browser, a proprietary client application (e.g., Oracle Forms), or some other application, which may be used by a user of the client computing device to interact with cloud infrastructure system 1802 to use services provided by cloud infrastructure system 1802.

It should be appreciated that cloud infrastructure system 1802 depicted in the figure may have other components than those depicted. Further, the embodiment shown in the figure is only one example of a cloud infrastructure system that may incorporate an embodiment of the disclosure. In some other embodiments, cloud infrastructure system 1802 may have more or fewer components than shown in the figure, may combine two or more components, or may have a different configuration or arrangement of components.

Client computing devices 1804, 1806, and 1808 may be devices similar to those described above for 1602, 1604, 1606, and 1608.

Although example system environment 1800 is shown with three client computing devices, any number of client computing devices may be supported. Other devices such as devices with sensors, etc. may interact with cloud infrastructure system 1802.

Network(s) 1810 may facilitate communications and exchange of data between clients 1804, 1806, and 1808 and cloud infrastructure system 1802. Each network may be any type of network familiar to those skilled in the art that can support data communications using any of a variety of commercially-available protocols, including those described above for network(s) 1810.

Cloud infrastructure system 1802 may comprise one or more computers and/or servers that may include those described above for server 1812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." In a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1802 may be adapted to automatically provision, manage and track a customer's subscription to services offered by cloud infrastructure system 1802. Cloud infrastructure system 1802 may provide the cloud services via different deployment models. For example, services may be provided under a public cloud model in which cloud infrastructure system 1802 is owned by an organization selling cloud services (e.g., owned by Oracle) and the services are made available to the general public or different industry enterprises. As another example, services may be provided under a private cloud model in which cloud infrastructure system 1802 is operated solely for a single organization and may provide services for one or more entities within the organization. The cloud services may also be provided under a community cloud model in which cloud infrastructure system 1802 and the services provided by cloud infrastructure system 1802 are shared by several organizations in a related community. The cloud services may also be provided under a hybrid cloud model, which is a combination of two or more different models.

In some embodiments, the services provided by cloud infrastructure system 1802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1802. Cloud infrastructure system 1802 then performs processing to provide the services in the customer's subscription order.

In some embodiments, the services provided by cloud infrastructure system 1802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1802 may also include infrastructure resources 1830 for providing the resources used to provide various services to customers of the cloud infrastructure system. In one embodiment, infrastructure resources 1830 may include pre-integrated and optimized combinations of hardware, such as servers, storage, and networking resources to execute the services provided by the PaaS platform and the SaaS platform.

In some embodiments, resources in cloud infrastructure system 1802 may be shared by multiple users and dynamically re-allocated per demand. Additionally, resources may be allocated to users in different time zones. For example, cloud infrastructure system 1830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1832 may be provided that are shared by different components or modules of cloud infrastructure system 1802 and by the services provided by cloud infrastructure system 1802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1802, and the like.

In one embodiment, as depicted in the figure, cloud management functionality may be provided by one or more modules, such as an order management module 1820, an order orchestration module 1822, an order provisioning module 1824, an order management and monitoring module 1826, and an identity management module 1828. These modules may include or be provided using one or more computers and/or servers, which may be general purpose computers, specialized server computers, server farms, server clusters, or any other appropriate arrangement and/or combination.

In example operation 1834, a customer using a client device, such as client device 1804, 1806 or 1808, may interact with cloud infrastructure system 1802 by requesting one or more services provided by cloud infrastructure system 1802 and placing an order for a subscription for one or more services offered by cloud infrastructure system 1802. In certain embodiments, the customer may access a cloud User Interface (UI), cloud UI 1812, cloud UI 1814 and/or cloud UI 1816 and place a subscription order via these UIs. The order information received by cloud infrastructure system 1802 in response to the customer placing an order may include information identifying the customer and one or more services offered by the cloud infrastructure system 1802 that the customer intends to subscribe to.

After an order has been placed by the customer, the order information is received via the cloud UIs, 1812, 1814 and/or 1816.

At operation 1836, the order is stored in order database 1818. Order database 1818 can be one of several databases operated by cloud infrastructure system 1818 and operated in conjunction with other system elements.

At operation 1838, the order information is forwarded to an order management module 1820. In some instances, order management module 1820 may be configured to perform billing and accounting functions related to the order, such as verifying the order, and upon verification, booking the order.

At operation 1840, information regarding the order is communicated to an order orchestration module 1822. Order orchestration module 1822 may utilize the order information to orchestrate the provisioning of services and resources for the order placed by the customer. In some instances, order orchestration module 1822 may orchestrate the provisioning of resources to support the subscribed services using the services of order provisioning module 1824.

In certain embodiments, order orchestration module 1822 enables the management of business processes associated with each order and applies business logic to determine whether an order should proceed to provisioning. At operation 1842, upon receiving an order for a new subscription, order orchestration module 1822 sends a request to order provisioning module 1824 to allocate resources and configure those resources needed to fulfill the subscription order. Order provisioning module 1824 enables the allocation of resources for the services ordered by the customer. Order provisioning module 1824 provides a level of abstraction between the cloud services provided by cloud infrastructure system 1800 and the physical implementation layer that is used to provision the resources for providing the requested services. Order orchestration module 1822 may thus be isolated from implementation details, such as whether or not services and resources are actually provisioned on the fly or pre-provisioned and only allocated/assigned upon request.

At operation 1844, once the services and resources are provisioned, a notification of the provided service may be sent to customers on client devices 1804, 1806 and/or 1808 by order provisioning module 1824 of cloud infrastructure system 1802. At operation 1846, the customer's subscription order may be managed and tracked by an order management and monitoring module 1826. In some instances, order management and monitoring module 1826 may be configured to collect usage statistics for the services in the subscription order, such as the amount of storage used, the amount data transferred, the number of users, and the amount of system up time and system down time.

In certain embodiments, cloud infrastructure system 1800 may include an identity management module 1828. Identity management module 1828 may be configured to provide identity services, such as access management and authorization services in cloud infrastructure system 1800. In some embodiments, identity management module 1828 may control information about customers who wish to utilize the services provided by cloud infrastructure system 1802. Such information can include information that authenticates the identities of such customers and information that describes which actions those customers are authorized to perform relative to various system resources (e.g., files, directories, applications, communication ports, memory segments, etc.). Identity management module 1828 may also include the management of descriptive information about each customer and about how and by whom that descriptive information can be accessed and modified.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

What is claimed is:

1. A computer-implemented method, comprising:
    parsing, by a computing system, a plurality of configuration files that correspond to a plurality of services to be deployed to a plurality of execution targets of a cloud-computing environment;
    generating, by the computing system based at least in part on the parsing, a data structure representing an order of execution corresponding to a plurality of phases, a first phase of the plurality of phases being associated with a first subset of services of the plurality of services and a first subset of execution targets of the plurality of execution targets, the first subset of services to be deployed to the first subset of execution targets of the plurality of execution targets;
    preparing, by the computing system, a user interface for presentation at a user device, the user interface comprising a graphical representation of the data structure and indicating the order of execution corresponding to the plurality of phases;
    tracking, by the computing system, deployments of the plurality of services to the plurality of execution targets; and
    updating, by the computing system, the graphical representation to indicate a deployment progress of deploying the first subset of services associated with the first phase.

2. The computer-implemented method of claim 1, further comprising executing a cloud infrastructure orchestration service that is configured to provision infrastructure resources and to deploy one or more services to the cloud-computing environment based at least in part on the plurality of configuration files, the plurality of configuration files collectively describing, via declarative instructions, the infrastructure resources to be provisioned and the services to be deployed.

3. The computer-implemented method of claim 1, wherein a first portion of the graphical representation of the data structure corresponds to the first phase of the plurality of phases, wherein a second portion of the graphical representation of the data structure corresponds to a second phases of the plurality of phases, and wherein the order of execution of the plurality of phases is indicated based at last in part on a first position of the first portion of the graphical representation in relation to a second position of the second portion of the graphical representation.

4. The computer-implemented method of claim 1, wherein a first portion of the graphical representation corresponding to the first phase comprises an additional graphical representation, the additional graphical representation indicating a number corresponding to the first subset of services to be deployed to the first subset of execution targets of the plurality of execution targets.

5. The computer-implemented method of claim 4, wherein the additional graphical representation indicates an order or concurrency with which deployments are made to the first subset of execution targets of the plurality of execution targets.

6. The computer-implemented method of claim 4, wherein the additional graphical representation represents a directed acyclic graph that is generated based at least in part on parsing the plurality of configuration files.

7. The computer-implemented method of claim 4, further comprising causing portions of the additional graphical representation to be colorized based at least in part on tracking the deployments of the plurality of services to the plurality of execution targets, wherein colorizing a portion of the additional graphical representation indicates the deployment progress of deploying the first subset of services to the first subset of execution targets of the plurality of execution targets that are associated with the first phase.

8. A computing system, comprising:
one or more processors; and
one or more memories storing computer-executable instructions that, when executed by the one or more processors, causes the computing system to:
parse a plurality of configuration files that correspond to a plurality of services to be deployed to a plurality of execution targets of a cloud-computing environment;
generate, based at least in part on the parsing, a data structure representing an order of execution corresponding to a plurality of phases, a first phase of the plurality of phases being associated with a first subset of services of the plurality of services and a first subset of execution targets of the plurality of execution targets, the first subset of services to be deployed to the first subset of execution targets of the plurality of execution targets;
prepare a user interface for presentation at a user device, the user interface comprising a graphical representation of the data structure and indicating the order of execution corresponding to the plurality of phases;
track deployments of the plurality of services to the plurality of execution targets; and
update the graphical representation to indicate a deployment progress of deploying the first subset of services associated with the first phase.

9. The computing system of claim 8, wherein executing the computer executable-instructions further causes the computing system to execute a cloud infrastructure orchestration service configured to provision infrastructure resources and to deploy one or more services to the cloud-computing environment based at least in part on the plurality of configuration files, the plurality of configuration files collectively describing, via declarative instructions, the infrastructure resources to be provisioned and the services to be deployed.

10. The computing system of claim 8, wherein a first portion of the graphical representation of the data structure corresponds to the first phase of the plurality of phases, wherein a second portion of the graphical representation of the data structure corresponds to a second phases of the plurality of phases, and wherein the order of execution of the plurality of phases is indicated based at last in part on a first position of the first portion of the graphical representation in relation to a second position of the second portion of the graphical representation.

11. The computing system of claim 8, wherein a first portion of the graphical representation corresponding to the first phase comprises an additional graphical representation, the additional graphical representation indicating a number corresponding to the first subset of services to be deployed to the first subset of execution targets of the plurality of execution targets.

12. The computing system of claim 11, wherein the additional graphical representation indicates an order or concurrency with which deployments are made to the first subset of execution targets of the plurality of execution targets.

13. The computing system of claim 11, wherein the additional graphical representation represents a directed acyclic graph that is generated based at least in part on parsing the plurality of configuration files.

14. The computing system of claim 11, wherein executing the computer executable-instructions further causes the computing system to cause respective portions of the additional graphical representation to be colorized based at least in part on tracking the deployment of the plurality of services to the plurality of execution targets, wherein colorizing a portion of the additional graphical representation indicates the deployment progress of deploying the first subset of services to the first subset of execution targets of the plurality of execution targets that are associated with the first phase.

15. A non-transitory computer-readable medium storing computer-executable instructions that, when executed by one or more processors of a computing system, cause the one or more processors to:
parse a plurality of configuration files that correspond to a plurality of services to be deployed to a plurality of execution targets of a cloud-computing environment;
generate, based at least in part on the parsing, a data structure representing an order of execution corresponding to a plurality of phases, a first phase of the plurality of phases being associated with a first subset of services of the plurality of services and a first subset of execution targets of the plurality of execution targets, the first subset of services to be deployed to the first subset of execution targets of the plurality of execution targets;
prepare a user interface for presentation at a user device, the user interface comprising a graphical representation of the data structure and indicating the order of execution corresponding to the plurality of phases;
track deployments of the plurality of services to the plurality of execution targets; and
update the graphical representation to indicate a deployment progress of deploying the first subset of services associated with the first phase.

16. The non-transitory computer-readable medium of claim 15, wherein a first portion of the graphical representation of the data structure corresponds to the first phase of the plurality of phases, wherein a second portion of the graphical representation of the data structure corresponds to a second phases of the plurality of phases, and wherein the order of execution of the plurality of phases is indicated based at last in part on a first position of the first portion of the graphical representation in relation to a second position of the second portion of the graphical representation.

17. The non-transitory computer-readable medium of claim 15, wherein a first portion of the graphical representation corresponding to the first phase comprises an additional graphical representation, the additional graphical representation indicating a number corresponding to the first subset of services to be deployed to the first subset of execution targets of the plurality of execution targets.

18. The non-transitory computer-readable medium of claim 17, wherein the additional graphical representation indicates an order or concurrency with which deployments are made to the first subset of execution targets of the plurality of execution targets.

19. The non-transitory computer-readable medium of claim 17, wherein the additional graphical representation represents a directed acyclic graph that is generated based at least in part on parsing of the plurality of configuration files.

20. The non-transitory computer-readable medium of claim 17, wherein executing the computer executable-instructions further causes the one or more processors to cause respective portions of the additional graphical representation to be colorized based at least in part on tracking the deployments of the plurality of services to the plurality of execution targets, wherein colorizing a portion of the additional graphical representation indicates the deployment progress of deploying the first subset of services to the first subset of execution targets of the plurality of execution targets that are associated with the first phase.

\* \* \* \* \*